(12) United States Patent
Ismail

(10) Patent No.: US 8,925,768 B1
(45) Date of Patent: Jan. 6, 2015

(54) DISPENSER AND MEASURING CAP DEVICE AND METHOD

(71) Applicant: Muhammad Sami Ismail, Nashville, TN (US)

(72) Inventor: Muhammad Sami Ismail, Nashville, TN (US)

( * ) Notice: Subject to any disclaimer, the term of this patent is extended or adjusted under 35 U.S.C. 154(b) by 0 days.

(21) Appl. No.: 14/220,290

(22) Filed: Mar. 20, 2014

Related U.S. Application Data

(63) Continuation-in-part of application No. 13/964,709, filed on Aug. 12, 2013.

(51) Int. Cl.
G01F 11/28 (2006.01)
G01F 11/26 (2006.01)
B67D 7/22 (2010.01)

(52) U.S. Cl.
USPC ............. 222/434; 222/436; 222/456; 222/41; 222/427

(58) Field of Classification Search
USPC ........... 222/434, 436, 444, 445, 456, 455, 41, 222/427
See application file for complete search history.

(56) References Cited

U.S. PATENT DOCUMENTS

| | | | |
|---|---|---|---|
| 2,748,995 A | 6/1956 | Hightower |
| 2,834,519 A | 5/1958 | Miller |
| 2,877,937 A | 3/1959 | Weir |
| 2,904,230 A | 9/1959 | Worth |
| 2,985,343 A | 5/1961 | Mask |
| 3,129,853 A | 4/1964 | Hoskins |
| 3,308,995 A | 3/1967 | Lee et al. |
| 3,991,908 A | 11/1976 | Thomas et al. |
| 4,032,050 A | 6/1977 | Funk |
| 4,257,541 A | 3/1981 | Souza |
| 4,674,660 A | 6/1987 | Botto |
| 4,691,821 A | 9/1987 | Hofmann |
| 4,832,235 A | 5/1989 | Palmer |
| 4,892,126 A | 1/1990 | Bucheler et al. |
| 4,957,219 A | 9/1990 | Robbins |
| 5,123,574 A | 6/1992 | Poulos |
| 5,495,962 A | 3/1996 | Nomura |

(Continued)

FOREIGN PATENT DOCUMENTS

EP 2128038 2/2009
EP WO2009106489 9/2009

OTHER PUBLICATIONS

New World Innovations, Inc., Aspin Dispensing Bottle Cap, http://newworldinnovations.com/bottlecap.

Primary Examiner — J. Casimer Jacyna
Assistant Examiner — Benjamin R Shaw
(74) Attorney, Agent, or Firm — Stites & Harbison PLLC; Kelly J. Hollowell

(57) ABSTRACT

Spill and contaminant resistant dispensers and measuring cap devices and methods for measuring and dispensing a desired amount of a bulk particulate, powdery, granular or viscous liquid substance from a storage container through a cap or a dispenser are provided. A dispenser and measuring cap is attached to a storage container or comprises an integral storage container. The dispenser and measuring cap has one or more measuring chamber ducts, each having a different predetermined volume. The measuring chamber ducts are selectively and separately operationally aligned with an internal funnel stem and a dispensing spout. A selected measuring chamber duct is filled with the substance by inverting the cap and attached container. A measured amount of the substance is captured and dispensed, and the unused portion of the substance retained in the storage container without exposure to outside contaminants or implements, by rotating the duct into operational alignment with the spout.

20 Claims, 19 Drawing Sheets

(56) References Cited

U.S. PATENT DOCUMENTS

| | | |
|---|---|---|
| 5,662,249 A | 9/1997 | Grosse |
| 5,711,463 A * | 1/1998 | Chen et al. .................... 222/456 |
| 5,746,355 A | 5/1998 | Wold |
| 5,772,086 A | 6/1998 | Krafft |
| 5,855,302 A | 1/1999 | Fisscher |
| 5,865,331 A | 2/1999 | Jacobs |
| 5,934,516 A | 8/1999 | Strycharske et al. |
| 5,941,380 A | 8/1999 | Rothman |
| 6,283,339 B1 | 9/2001 | Morrow |
| 6,302,295 B1 | 10/2001 | Weisman |
| 6,330,960 B1 * | 12/2001 | Faughey et al. ............... 222/205 |
| 6,422,426 B1 | 7/2002 | Robbins |
| 6,601,734 B1 | 8/2003 | Smith |
| 6,929,159 B1 | 8/2005 | Haig |
| 6,948,641 B1 * | 9/2005 | Williams ....................... 222/456 |
| 7,240,795 B2 * | 7/2007 | Lee ................................ 206/539 |
| 7,350,673 B2 | 4/2008 | Glynn et al. |
| 7,950,550 B2 * | 5/2011 | Webster et al. ............... 222/370 |
| 2001/0030165 A1 | 10/2001 | Jacobs |
| 2005/0184090 A1 | 8/2005 | Dejonge |
| 2007/0228083 A1 * | 10/2007 | Catani .......................... 222/452 |
| 2009/0236339 A1 * | 9/2009 | Blomdahl ................... 220/254.1 |
| 2010/0170910 A1 * | 7/2010 | Ludewigs et al. ............. 220/810 |
| 2011/0163135 A1 * | 7/2011 | Herald et al. ................. 222/556 |
| 2012/0280000 A1 | 11/2012 | Attie et al. |

* cited by examiner

DISPENSER AND MEASURING CAP DEVICE AND METHOD

The present application is a continuation in part of U.S. application Ser. No. 13/964,709, filed Aug. 12, 2013, the contents of which are incorporated herein by reference in their entirety.

FIELD OF USE

The present disclosure relates generally to the field of closures for storage containers. More specifically, the present disclosure relates to a spill- and contamination-resistant dispenser and measuring cap for accurately measuring and dispensing a specific amount of a bulk substance from a storage container such as a bottle, jar, canister, jug, can and/or carton.

BACKGROUND

Many common food products, medicines, medicaments and other consumable substances are frequently stored in bulk quantities using relatively small, easily portable storage containers such as bottles, jars and canisters by individuals, retailers, and health care facilities for later dispensation, administration and/or use. Substances commonly stored in bulk are usually particulate, powdery, and/or granular substances such as medicines, medicaments, thickeners, baby formula, protein powders, coffee, sweeteners and other dry goods, but may also comprise viscous liquid substances such as cough syrups, honey, baby foods or fluid gels.

The accurate measuring and dispensation of a specific amount of a substance stored in bulk typically necessitates the use of at least four separate items, including (1) a storage container containing a substance to be measured and dispensed, (2) a closure for sealing the storage container and protecting the contents thereof from contamination and accidental spillage, (3) a measuring device (e.g., a measuring spoon or beaker) for measuring out a specific amount of the substance, and (4) a receiving container (e.g., a cup or bottle) for administering the measured amount of the substance dispensed. The need for so many separate items can make the measuring and dispensing of specific amounts of bulk substances both difficult and time consuming because it requires a user to hold and/or manipulate multiple articles, either sequentially (by placing each item on a working surface when not in use, which is slower) or simultaneously (which while faster, is awkward and increases the risk of spilling the substance).

A fifth article for facilitating the transfer of the bulk substance from the storage container to the receiving container (e.g., a funnel) is also commonly used in applications where the opening (i.e., "mouth") of the receiving container is particularly narrow or small compared to the measuring device or the opening of the storage container. However, the use of additional articles or tools to facilitate dispensation and administration increases the number of steps, risk of error and time required to achieve successful dispensation and administration of a measured amount of a substance, which can be problematic in situations where ease, consistency and speed of delivery are important.

These problems and risks can be further exacerbated by the use of traditional, reusable, open-top measuring devices, including measuring spoons, cups and beakers, because such devices are inaccurate, unreliable and susceptible to user error, which makes them inconsistent and prone to spilling. Such measuring devices also render the measured portion of the substance being dispensed, as well as the bulk portion remaining in the storage container, vulnerable to contamination by moisture, foreign substances, spoilage organisms and pathogens, which is especially problematic in the healthcare industry where accuracy and consistency of measurement, purity of substance, and avoidance of nosocomial infection is vital. In sum, traditional devices and methods for dispensing measured amounts of bulk substances are cumbersome, imprecise, inconsistent and subject the substance being dispensed to the needless risk of contamination and spoilage.

Various solutions to these problems have been proposed and found unsatisfactory. For example, omitting the use of a measuring device by simply pouring a bulk substance directly from a storage container into a receiving container (with or without the aid of a facilitating device such as a funnel) does not solve the foregoing deficiencies because this method prevents measurement and control of the amount being dispensed, and still exposes the substance to air, moisture, and other contaminants.

Additionally, some newer types of storage container closures having dual functions are known. For example, the caps provided with containers of some ingestible consumer products (e.g., cough syrup, mouth wash) serve both to seal the container when attached and as a dosing device when removed. These dosing caps allow the user to measure out and administer a predetermined volume of product into the cap when the cap is removed from the bottle. However, dosing caps are common fomites and must be cleaned prior to replacement of the cap on the storage container in order to prevent the transmission of germs spread to the cap by the user. Otherwise, any residual product inside the cap can migrate downward onto the exterior of the container, resulting in unwanted mess. Examples of dosing caps may be found in U.S. Pat. No. 4,892,126 to Bucherer et al., U.S. Pat. No. 5,662,249 to Grosse, and U.S. Pat. No. 5,865,331 to Jacobs et al.

Another newer type of closure facilitates the measurement and dispensation of a substance from a storage container without removing the cap. Some examples of these types of dispenser caps may be found in U.S. Pat. No. 2,748,995 to Hightower et al., U.S. Pat. No. 2,834,519 to Miller et al., U.S. Pat. No. 2,985,343 to Mask, U.S. Pat. No. 4,957,219 to Robbins et al., U.S. Pat. No. 5,855,302 to Fisscher et al., U.S. Pat. No. 6,422,426 to Robins, III et al., and U.S. Pat. Pub. No. 2001/0030165 A1 to Jacobs et al. One problem common to these types of dispenser caps is that they generally permit the manifestation of a direct, unobstructed channel or path between the interior of the storage container to which the cap is attached and the external environment at some point during their operation. This makes such caps prone to accidental spillage and contamination of the contents of the storage container by various external sources.

Although storage container and closure designers and manufacturers have developed many different variations of dosing caps and dispenser caps, there remains a need and a demand for a convenient, inexpensive, and easy to use spill- and contamination-resistant dispenser and measuring cap closure that can seal and protect the contents of a container from contamination by moisture, foreign substances and microorganisms during storage and use, and accurately, precisely and consistently measure and dispense a specific amount of a bulk substance from a container to which it is attached in one or more predetermined volumes corresponding to commonly prescribed amounts for a given substance.

The dispenser and measuring cap device disclosed herein satisfies this need through the provision of a single unitary closure for controlled measuring and dispensing of a substance from a storage container. The features and details of the device are listed and discussed below.

SUMMARY

The present disclosure provides convenient, easy to use, and inexpensive spill- and contamination-resistant dispensers and measuring cap devices and methods for measuring and dispensing a specific amount of a bulk particulate, powdery, granular or viscous liquid substance from a storage container through a cap. While there are many containers that may benefit from this disclosure, the disclosure is particularly useful with relatively small, hand-held and easily movable storage containers commonly found in modern homes, including bottles, jars, canisters, jugs, cans and/or cartons. The dispensers and measuring cap devices and methods of the present disclosure eliminate or significantly reduce the spillage and attendant waste inherent to dispensing a substance through the dosage and dispensing caps of the prior art. The devices and methods of the present disclosure also provide for simple, accurate and consistent measurement and dispensing of a prescribed amount of a particular substance using one or more measuring chamber ducts having different predetermined volumes without exposing the substance being dispensed or remaining in the storage container to unnecessary environmental, microbiological and foreign-object contamination. Suitable substances include particulate, powdery, granular, viscous liquid and fluid gel substances. In some embodiments, the substance to be measured and dispensed is stored in the container in bulk quantities for periodic dispensation.

The dispenser and measuring cap is releasably attached or integrally formed to a storage container. The device comprises one or more measuring chamber ducts, each having a different predetermined volume. In use, a selected measuring chamber duct is rotated into operational alignment with an internal funnel stem to fill the duct and then rotated out of alignment with the funnel stem and into alignment with a dispensing spout to dispense the substance. A selected measuring chamber duct placed in operational (i.e., vertical) alignment with the funnel stem is filled with the substance by inverting the dispenser and measuring cap device and attached container. A measured amount of the substance is captured for dispensing by sequentially rotating the duct out of vertical alignment with the funnel stem and into alignment with a dispensing spout. The unused portion of the substance is retained in the storage container without exposure to outside contaminants or implements.

In one aspect, the dispenser and measuring cap device of the present disclosure provides a device, which when sealably engaged with or otherwise attached to a storage container containing a particulate or viscous liquid substance and properly aligned and inverted, captures in an internal measuring chamber duct a precise amount of the substance from the storage container for dispensation through a spout in the proximal end piece of the device. More specifically, once the internal measuring chamber duct inside the cap is operationally aligned with an interior funnel and inverted, gravity causes the substance to pass through the funnel and fill the duct. The measuring chamber duct is then closed and/or sealed off from the rest of the substance remaining in the storage container and a specific amount is measured out by activating a divider built into the cap to rotate the duct housed therein away from the funnel stem. The measured amount of the substance is then dispensed by rotating the internal measuring chamber duct into operational alignment with a separate closeable spout that extends axially from the top surface of the cap and on an opposite side from the funnel stem (i.e., the funnel stem and coverable spout are not vertically aligned and are unable to be placed in communication without the aid of the measuring chamber duct).

The dispenser and measuring cap dispenses only the measured amount of the substance captured by the internal measuring chamber duct and retains and protects the remainder of the substance in the storage container from contamination by preventing the formation of a direct channel or path between the interior of the storage container and the external environment during all points of operation. These features of the invention allow a user to conveniently and easily (even single handedly) measure out and dispense a precise amount of a substance from a bulk storage container without exposing the unused portion of the substance to contamination, using only a single unitary item. The multifunctional design of the dispenser and measuring cap of the present disclosure also eliminates the need for a separate awkward measuring device that must be cleaned after each use.

In another aspect, the disclosure provides a method for one-handedly measuring and dispensing from a storage container a consistently accurate, specific amount of a bulk substance by sealably attaching a dispenser and measuring cap of the present disclosure to the opening or mouth of a storage container containing a particulate, powdery and/or granular, viscous liquid or fluid gel substance, arranging an internal measuring chamber duct into operational alignment an internal funnel, inverting the storage container to load a the measuring chamber duct with the substance, rotating the duct around a central axis to measure out a specific desired amount of the substance and put the duct into operational alignment with an external spout extending axially upward from the top surface of the cap, and dispensing the measured amount of the substance captured by the measuring chamber duct through the spout into a receiving container.

In some embodiments, the dispenser and measuring cap is a device that can be threaded onto or otherwise releasably yet sealably attached to a storage container for safe and reliable storage, measuring and dispensing of a specific amount of a particular substance from the storage container. In certain implementations, the dispenser and measuring cap is also configured with a handle for a user to grasp during operation and use as well as one or more flexible bracing arms adapted to receive and retain a separate disposable storage container, such as a disposable baby formula container.

In other embodiments, the dispenser and measuring cap comprises a dispenser having an integral storage container. The container can be substantially cylindrical shaped or tapered toward the top, and can comprise a handle for a user to grasp while operating the dispenser or dispensing a substance. In certain embodiments, the integral container comprises an opening or mouth in its bottom end to permit the container to be refilled with a substance for later dispensation. The container can also comprise a separate lid adapted to releasably yet sealably engage the opening or mouth in the bottom end. The container lid can comprise means for allowing a user to easily grasp and manipulate the lid, as well as means for receiving and stably holding the dispenser in an upside-down or inverted orientation during refilling.

In one embodiment, the dispenser and measuring cap device comprises a measuring chamber duct having a predetermined volume. In another embodiment, the dispenser and measuring cap device comprises a plurality of measuring chamber ducts, each having a different predetermined volume. In yet another embodiment, the dispenser and measuring cap device comprises at least one measuring chamber having a variable volume that is adjustable by a user. In some embodiments, the predetermined volume of a given measuring chamber duct corresponds to the generally recommended and/or prescribed dosing amount for common particulate, powdery, and/or granular, viscous liquid or fluid gel food products, dietary supplements, medicines and other consumable substances, including without limitation, baby formula, viscous baby foods, protein powders, coffee, sweeteners, cough syrups, honey, baby foods, fluid gels such as analgesic gels, and food additives and thickeners for treating dysphagia and similar conditions.

In some additional embodiments, the divider for measuring and transferring an amount of a substance from a storage container to the spout for dispensation may be activated by turning, twisting or rotating the divider around a central axis extending axially through the dispenser and measuring cap. In other embodiments, the divider may comprise an arm or tab-shaped member that extends or protrudes from an external surface or rim of the cap or dispenser. In some embodiments, the arm or tab-shaped member is positioned on the exterior rim of the divider at a point radial from the central axis to the internal measuring chamber duct relative to the central axis to facilitate alignment of the duct with the dispensing spout and funnel.

These and other advantages of the present disclosure, together with various embodiments thereof, will be more fully understood by those skilled in the art with reference to the following detailed description, claims and accompanying drawings.

DETAILED DESCRIPTION

Figure 1:
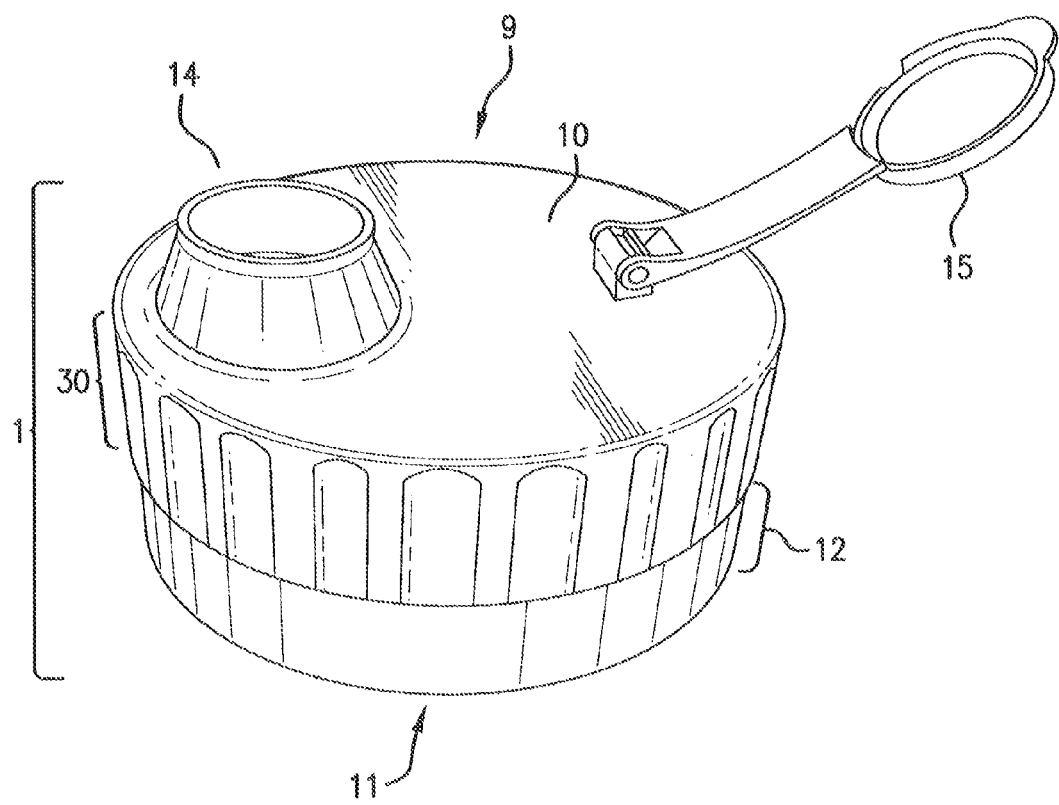
FIG. 1 shows a perspective top view of a dispenser and measuring cap constructed in accordance with the teachings of the present disclosure.
Figure 2:
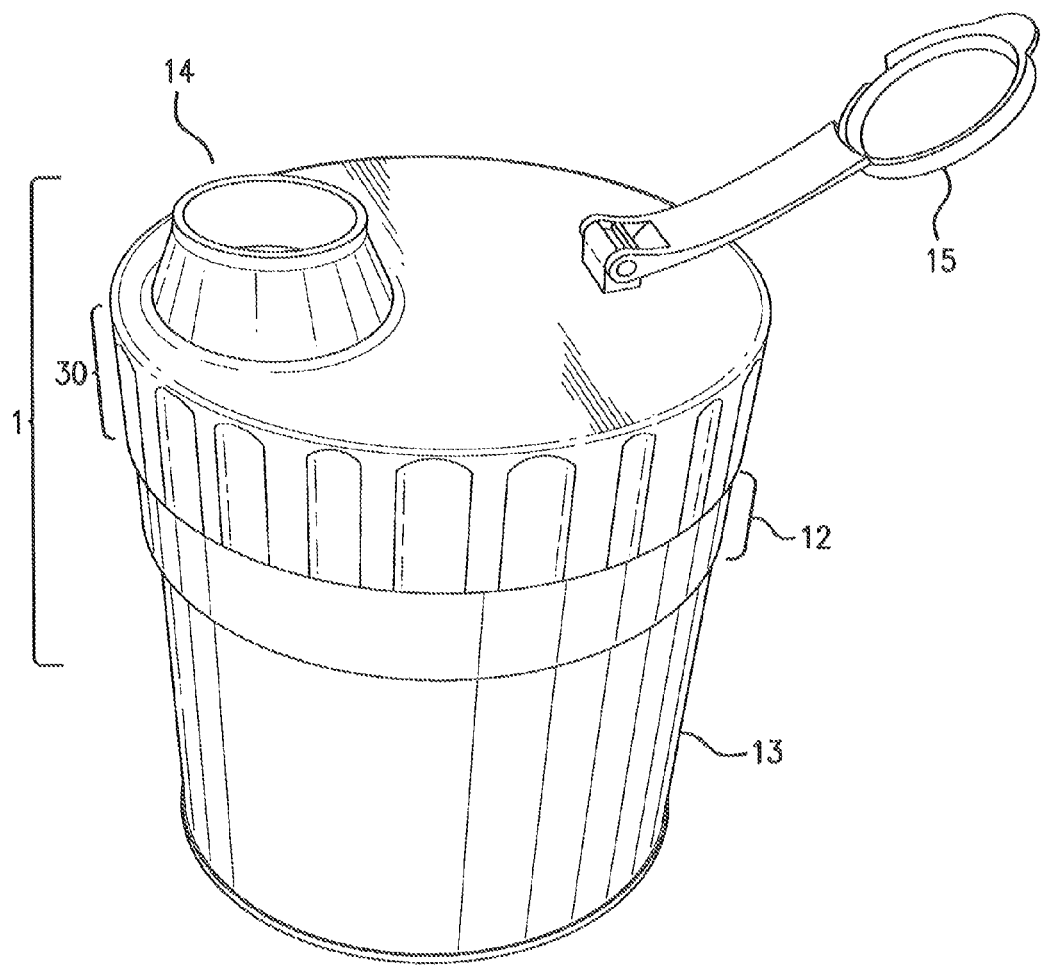
FIG. 2 shows a perspective top view of the dispenser and measuring cap of FIG. 1 attached to a cylindrical storage container.

In accordance with the present disclosure, an inexpensive and easy to use unitary dispenser and measuring cap closure designed to sealably engage a storage container and accurately and consistently measure and dispense a desired amount of substance therefrom is provided. In one embodiment, the amount dispensed is a single dose or single serving of substance. The presently disclosed dispenser and measuring cap device is a type of closure that attaches to the opening or mouth of various types of relatively small containers commonly used in homes, retail establishments and healthcare facilities to store food products, dietary supplements, medicines and other consumable particulate, powdery, and/or granular, viscous liquid or fluid gel substances in bulk quantities for periodic dispensation and administration.

The dispenser and measuring cap device solves the problems of prior art dosing and dispensing caps by providing an inexpensive device that is more convenient and easier to use, the device being operable to accurately measure and dispense a substance with only one hand once it is attached to an appropriate storage container. The present dispenser and measuring cap also provides for more accurate and consistent, reliable measurement and dispensing of a desired amount of particulate, powdery, granular or viscous liquid substances through the use of one or more completely enclosed internal measuring chamber ducts having predetermined volumes to capture and segregate a desired amount of the substance to be dispensed from the unused portion of the substance remaining in the container.

The devices disclosed herein further improve over the art by simultaneously sealing and protecting the contents of a container from inadvertent spillage and contamination by moisture, foreign substances and microorganisms during use and/or storage through nonlinear vertical positioning and separation of the two primary apertures for independently loading the internal measuring chamber duct with a measured amount of a substance and dispensing the substance from the duct through the device to a receiving container.

More specifically, the internal aperture through which a measuring chamber duct is filled with a substance from the storage container (i.e., a funnel stem) and the external spout through which the substance is dispensed are not vertically or operationally aligned. Rather, the two are disposed on opposite sides of a central axis extending vertically through the device and are separated by an intervening divider so that they cannot be placed in communication and/or operational alignment with each other without the aid of an internal measuring chamber duct contained within the intervening divider. Additionally, the funnel stem is not and cannot be vertically or operationally aligned with the external spout through which the substance is dispensed to create a direct passage or channel between the interior of the storage container and the external environment. The intervening divider containing an internal measuring chamber duct thus functions as a barrier or obstruction to prevent spilling and contamination of the contents of the container, as well as a measuring device and a shuttlecock for measuring out and transferring a measured amount of a substance from the storage container through the funnel stem to the spout. The internal measuring chamber duct is integral to the intervening divider and is moved between a first filling or loading position in operational alignment with the funnel stem and a second dispensing position in operational alignment with the external spout by grasping an external rim of the divider and turning, twisting or rotating the divider around the central axis of the device. In this way, the present disclosure provides devices that are both spill resistant and contamination resistant.

Figure 7:
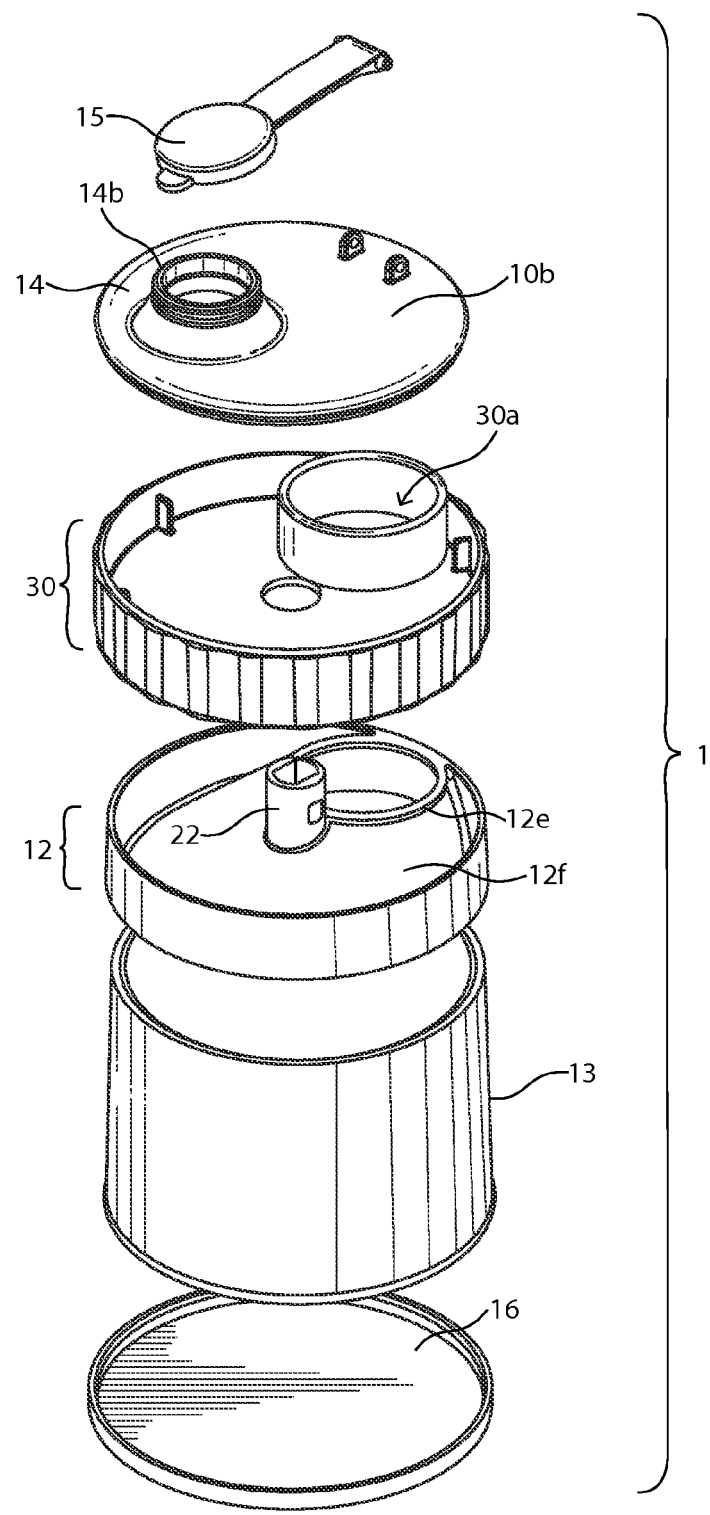
FIG. 7 shows an exploded top view of the dispenser and measuring cap of FIG. 1 and a storage container.
Figure 8:
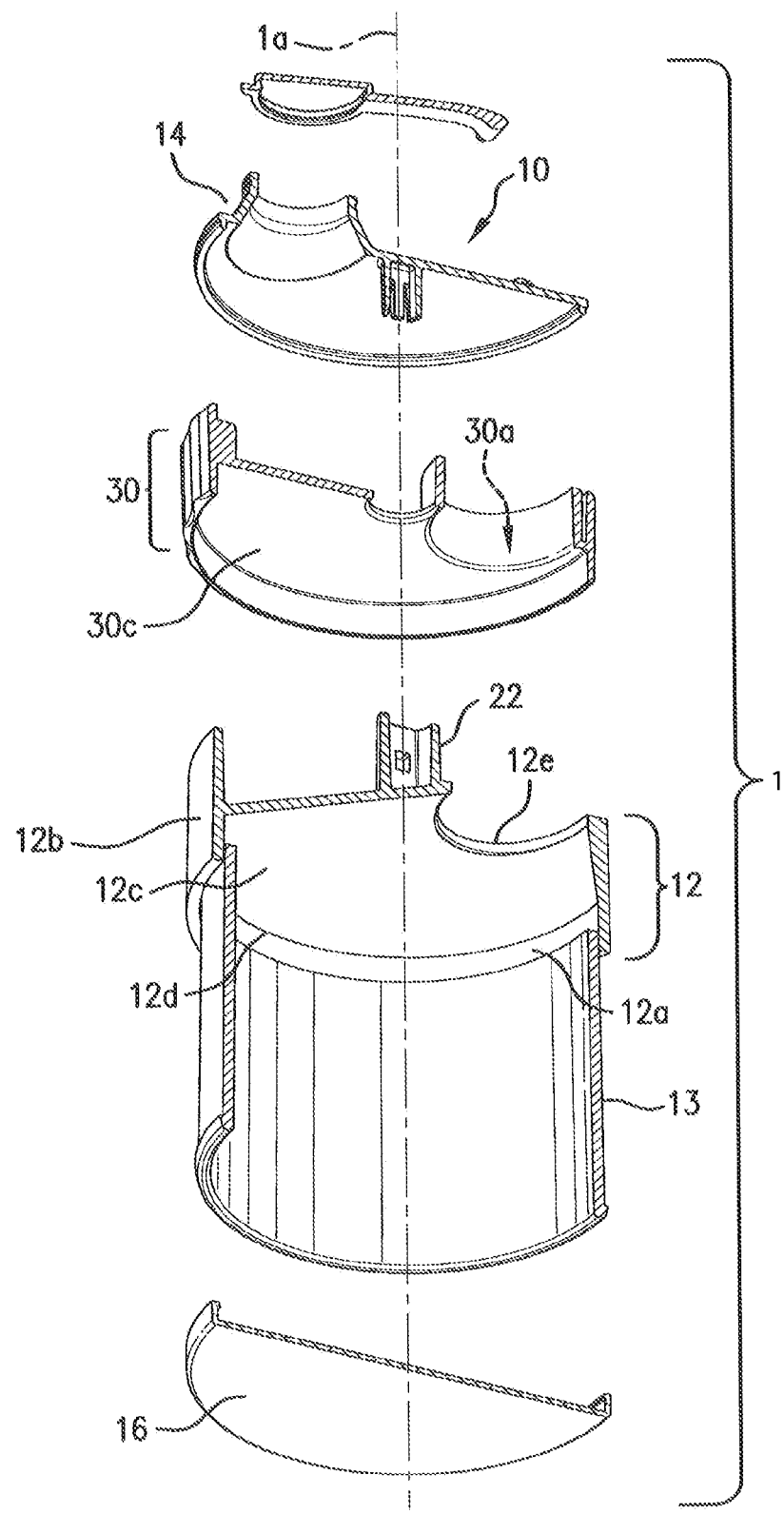
FIG. 8 shows a cutaway partially exploded bottom view of the dispenser and measuring cap of FIG. 1 with a storage container.

As shown in FIGS. 1, 2, 4 and 5, a dispenser and measuring cap device 1 of the present disclosure is a closure for a storage container and comprises a proximal end 9, a distal end 11, a divider 30 disposed between the proximal and distal ends, and an axle 22 extending through and connecting the proximal end, distal end, and divider along a center axis 1*a* (see FIG. 8). The proximal end 9 comprises a proximal end piece 10 comprising a closeable dispensing spout 14, a dispensing spout cap 15, an internal surface 10*a* and an external surface 10*b* (see FIGS. 6-7). The closeable dispensing spout 14 is positioned off-center from the center axis 1*a* of the device 1 and comprises an inlet 14*a* disposed on and flush with the internal surface 10*a* of the proximal end piece 10, and an outlet 14*b* extending upward from the external surface 10*b* of the proximal end piece 10 (see FIGS. 6-7). The outlet 14*b* of the spout 14 may be any size and/or shape, but in one embodiment, the outlet 14*b* has a smaller diameter and/or circumference than the inlet 14*a*. The dispensing spout cap 15 is attached to the external surface 10*b* of the proximal end piece 10 of the device 1 and is adapted to releasably close, cover and seal the dispensing outlet 14*b* of the dispensing spout 14 (see FIGS. 4-5).

The distal end 11 of the dispenser and measuring cap device 1 comprises an interface 12 adapted to releasably yet sealably engage the opening or mouth of an appropriate storage container 13. The interface 12 may be adapted to engage the storage container 13 with any means sufficient to form a seal capable of preventing the escape from or introduction into the storage container 13, through the interface 12, of any substance or contaminant during use or storage of the container while the device 1 is installed. Suitable means for sealably engaging (i.e., attaching) the interface 12 of the device 1 with the opening or mouth of a storage container 13 include, for example, screw threads, latches, insets, snaps, clips, tape, adhesive, nesting diameter, interlocking complementary geometry and the like. In one embodiment (not shown), the storage container 13 and the dispenser and measuring cap device 1 are molded as a single piece. In an alternate embodiment (See FIGS. 15-16), a storage container is molded as a single piece with the interface. In some embodiments, the dispenser and measuring cap device 1 includes an integral storage container comprising a separate opening for filling the container with a substance and a removable lid 16, 55 (see FIGS. 6-8, 12, 15-16) adapted to sealingly yet releasably engage the opening.

Figure 3:
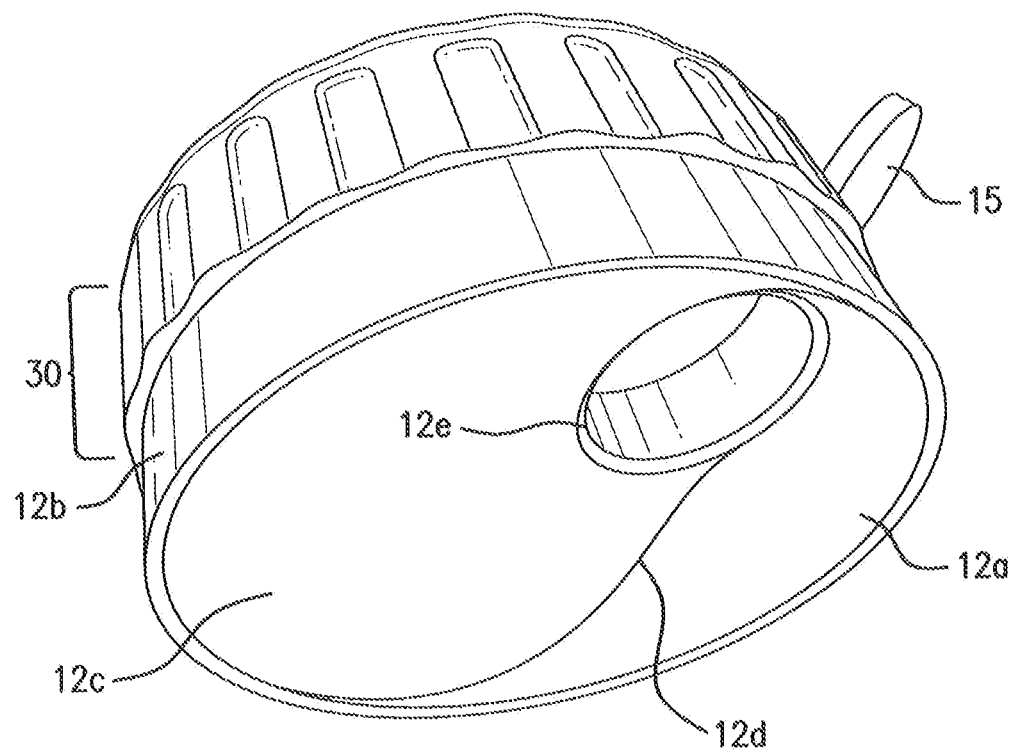
FIG. 3 shows a perspective bottom view of the dispenser and measuring cap of FIG. 1.
Figure 4:
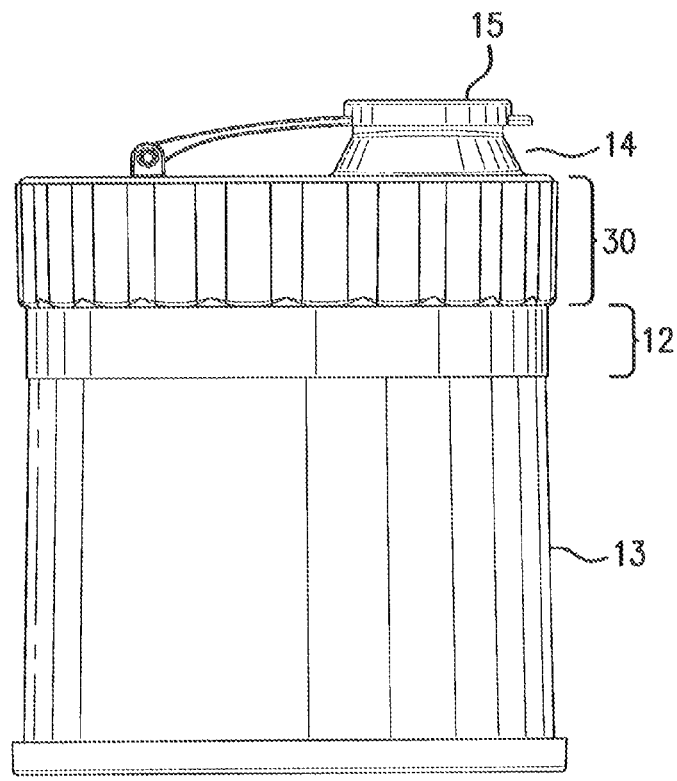
FIG. 4 is a side view of the dispenser and measuring cap of FIG. 2.
Figure 5:
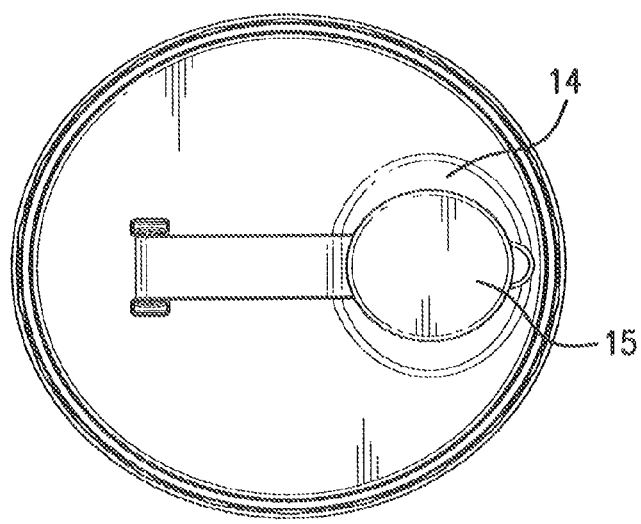
FIG. 5 is a top view of the dispenser and measuring cap of FIG. 1.

As shown in FIGS. 3, 7 and 8, the interface 12 further comprises a lower side 12*a*, and an outside 12*b* adapted to be gripped and manipulated by a user. The lower side 12*a* of the interface 12 comprises a shallow interface funnel 12*c* facing the inside of the storage container 13. The shallow funnel 12*c* has a wide mouth 12*d* that slopes away from the inside of the storage container and defines a short funnel stem 12*e* through which the substance to be dispensed must pass. The funnel stem 12*e* is positioned off-center from the center axis 1*a* of the device 1 and extends upward from the wide mouth 12*d* toward the proximal end 9 of the device 1 to the divider 30. In some embodiments, the funnel stem 12*e* and closeable dispensing spout 14 are disposed on opposite sides of a central axis from each other. In one embodiment, the short funnel stem 12*e* is omitted and the interface funnel 12*c* resolves as a simple aperture or hole having no significant depth (not shown). In some embodiments, the wide mouth 12*d* is substantially the same size and diameter as the opening or mouth of the storage container 13. In other embodiments, the wide mouth 12*d* may have a larger or smaller size and diameter than the opening or mouth of the storage container 13. The interface 12 also comprises a upper side 12*f* opposite the interface funnel 12*c*. In some embodiments, the upper side 12*f* is sloped to reflect the inverted slope of the interface funnel 12*c* as shown in FIG. 7. In other embodiments, the upper side 12*f* is flat (not shown) and substantially contacts the lower internal surface 30*c* of the divider 30 (i.e., the upper side 12*f* does not reflect the inverted slope of the interface funnel 12*c* shown in FIG. 3).

Figure 6:
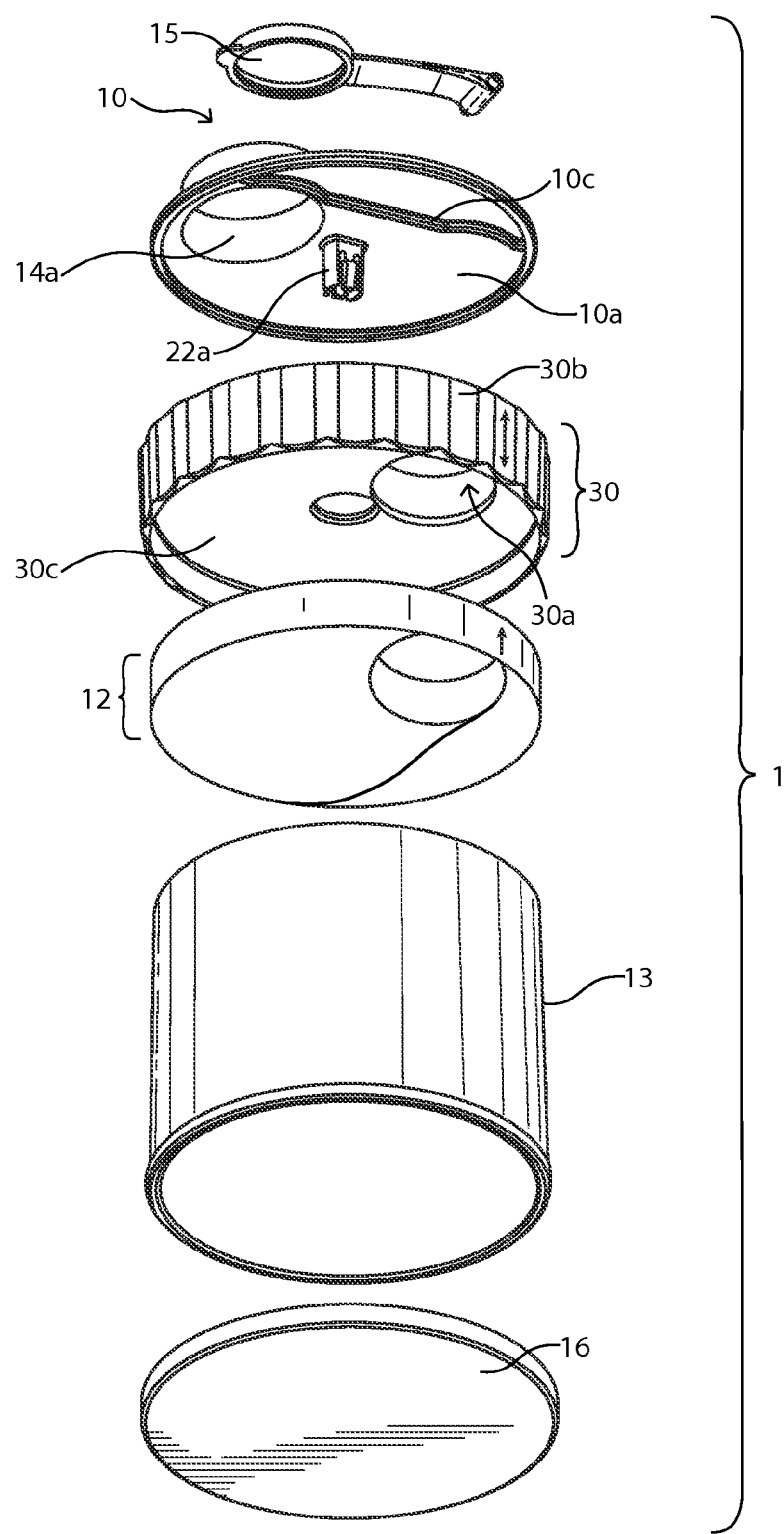
FIG. 6 shows an exploded bottom view of the dispenser and measuring cap of FIG. 1 and a storage container.

As shown in FIGS. 6, 7 and 8, a divider 30 having an external rim 30*b* is disposed between the spout 14 of the proximal end 9 and the interface 12 of the distal end 11. In one embodiment, the divider 30 is shaped like a disc and is circumscribed by the external rim 30*b*. The divider 30 is also penetrated axially by at least one measuring chamber duct 30*a* having a discernable length and/or depth defining a predetermined internal volume equal to a single dose or single serving of a substance to be measured and dispensed. For example, in one embodiment, the internal volume defined by the measuring chamber duct 30*a* equals a single dose or single serving for a particular brand of baby formula being measured and dispensed by the dispenser and measuring cap device 1 of the present disclosure.

Figure 9:
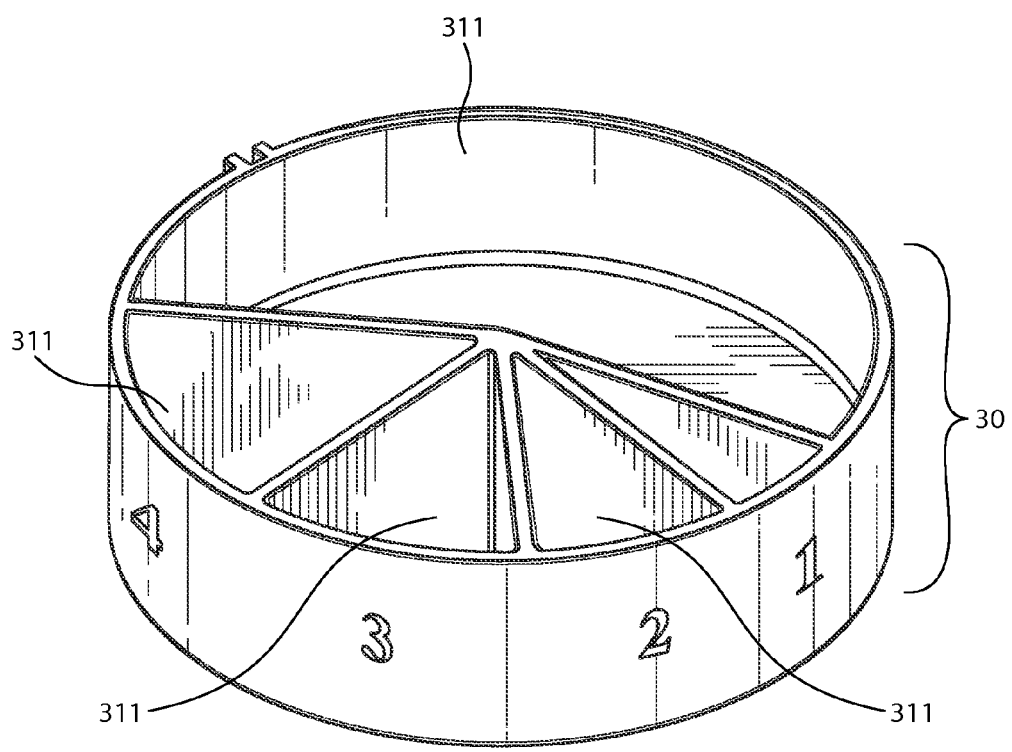
FIG. 9 shows a perspective top view of an alternate embodiment of a divider for use a dispenser and measuring cap disclosed herein.

In another embodiment, the measuring chamber duct 30*a* is a cylindrical pipe passing through the divider 30. In yet another embodiment, the measuring chamber duct 30*a* has an elliptical, square, rectangular or triangular shape. In still yet another embodiment, the measuring chamber duct 30*a* is defined by a void cut out from an otherwise solid divider 30. In even yet another embodiment, the measuring chamber duct 30*a* is the same shape and size as the funnel stem 12*e* defined by the terminal end of the interface funnel 12*c*. In other embodiments, the divider 30 may comprise a plurality of measuring chamber ducts 311 (see FIG. 9) and/or more than one spout 14 (not shown). In a related embodiment, each measuring chamber duct of the plurality 311 has a different size and volume.

In some embodiments, the external rim 30*b* of the divider 30 may be marked with indicia or labels to assist a user in determining the specific volume(s) of one or more measuring chamber ducts 30*a*, 311. In related embodiments, the external rim 30*b* of the divider 30 may be turned or "dialed" by a user to select a desired amount of substance to be measured and dispensed according to, in some embodiments, indicia or labels which may be present on the exterior surface 12*b* of the interface 12, the proximal end piece 10 of the device 1, the external rim 30*b* of the divider 30, and/or on the container 13. In some embodiments, the outside rim 30*b* of the divider 30 may be marked or labeled to indicate whether a measuring chamber duct 30*a* is in operational alignment with the funnel stem 12*e* or spout 14. In additional embodiments, the indicia are legible from both an inverted or upright position.

As also shown in FIGS. 6, 7 and 8, the proximal end piece 10 of the dispenser and measuring cap device 1 is attached to the interface 12 by an axle 22. In one embodiment, the axle 22 passes through the divider 30 along the center axis 1a in such a way so as to enable the divider 30 to spin, turn, twist or rotate on the axle 22 relative to the proximal end piece 10 and the interface 12. Other means of attachment may be appropriate so long as the divider 30 and its integral measuring chamber duct 30a may rotate about the center axis 1a. In another embodiment, the overall diameter of the divider 30 is greater than the overall diameters of both the proximal end piece 10 and the interface 12, so that the divider 30 transects the dispenser and measuring cap device 1. In yet another embodiment, the external rim 30b of the divider 30 extends radially beyond and overlaps the respective adjacent edges of the proximal end piece 10 and the interface 12, thereby providing a comfortable area for a user to grip and easily rotate the divider 30 and the integral measuring chamber duct 30a therein. In this way, the divider 30 serves as an intervening barrier between the funnel stem 12e and the dispensing spout 14 and protects the contents of an attached storage container 13 from spillage and contamination by preventing uncontrolled communication between the two.

In some embodiments, the axle 22 comprises a locking mechanism 22a that extends downward internally from the internal surface 10a of the proximal end piece 10 through the divider 30 to connect the proximal end piece 10 to the interface 12. In other embodiments, the locking mechanism 22a also inhibits the divider 30 from rotating beyond a particular position or completely inhibits all rotation of the divider 30. In an alternate embodiment, the internal surface 10a of the proximal end piece 10 comprises a stop member 10c against which the measuring chamber duct 30a of the divider 30 may abut to inhibit the rotation of the measuring chamber duct 30a to less than 360 degrees, including, in one embodiment, to approximately 180 degrees, and thereby facilitate precise alignment of the measuring chamber duct 30a with the dispensing spout 14 and the funnel stem 12e. In another embodiment, the stop member 10c facilitates precise operational alignment of the measuring chamber duct 30a with the dispensing spout 14 and the funnel stem 12e by limiting the rotation of the duct to an angle defined by the spout 14 at a first position and the stem 12e at a second position.

As shown in FIG. 8, the spout 14 and the funnel stem 12e are disposed within the device 1 on opposite sides of a central axis 1a at an angle of about 180 degrees to each other. The spout 14 and the funnel stem 12e cannot be vertically or operationally aligned to create a direct passage or channel between the interior of the storage container 13 through the funnel stem 12e and the external environment through the dispensing spout 14. Additionally, the measuring chamber duct cannot be operationally aligned (i.e., communicatively aligned in whole or part so as to allow the transfer of a substance from or through the aligned members) with both the funnel stem 12e and the spout 14 at the same time. This arrangement makes the formation of a clear passage between the interior of the storage container 13 and the external environment impossible, thus all but eliminating the risk of accidental spillage and the contamination of the contents of the container 13 by precluding the uncontrolled passage of materials (including the substance to be dispensed and contaminants) through device 1. Indeed, measurement and dispensation of a substance from the storage container can only be achieved by moving the measuring chamber duct 30a in and out of operational alignment with first the funnel stem 12e of the interface funnel 12c and then the dispensing spout 14 by turning, twisting or rotating the external rim 30b of the divider 30.

The measuring chamber duct 30a must be operatively aligned with the funnel stem 12e to funnel the substance from the opening of the storage container 13 through the interface funnel 12c into the measuring chamber duct 30a. If the measuring chamber duct 30a is not operatively aligned (i.e., not at least partially vertically aligned) with the stem 12e of the interface funnel 12c, the funnel stem 12e will remain closed and sealed off at its proximal end by the flat lower internal surface 30c of the divider 30. Coordinately, in embodiments where the upper side 12f of the interface 12 is flat, the measuring chamber duct 30a will remain closed and sealed off from the storage container 13 at its distal end by the flat upper side 12f of the interface 12 while it is not operatively aligned with the funnel stem 12e.

A quantity of substance is loaded into the measuring chamber duct 30a from the storage container 13 by inverting the device 1 and storage container 13. Gravity forces the substance through the interface funnel 12c and funnel stem 12e into the measuring chamber duct 30a to the point of overflowing. Measurement and dispensation of a precise predetermined amount of the substance is then be achieved by manipulating the external rim 30b of the divider 30 to rotate the measuring chamber duct 30a out of operational alignment with the funnel stem 12e at a first position and into operational alignment with the spout 14 at a second position. The movement of the measuring chamber duct 30a out of alignment with the funnel stem 12e causes the excess substance overflowing the measuring chamber duct 30a to be scraped off by an internal edge of the funnel stem 12e as the measuring chamber duct 30a rotates out of operational alignment. Excess substance falls back into the storage container 13 while the amount of substance to be dispensed is captured by the measuring chamber duct 30a and prohibited from backflowing into the storage container 13.

When the measuring chamber duct 30a is not operationally aligned with the spout 14, the measuring chamber duct 30a is closed and sealed off at its proximal end by the flat internal surface 10a of the proximal end piece 10 of the device 1. Thus, dispensation of the measured amount of substance requires rotation of the measuring chamber duct 30a into operational alignment with the spout 14. Once the measuring chamber duct 30a and the spout are operational aligned, the measured amount of substance will fall out of the measuring chamber duct 30a into the inlet 14a of the closeable dispensing spout 14. In one embodiment, the inlet 14a of the spout 14 has the same size and shape as the measuring chamber duct 30a. The spout cap 15 must be removed from the dispensing spout 14 to dispense the measured amount of substance into a receiving container (i.e., the spout must be open and not closed). However, if the spout cap 15 is opened or the outlet 14b of the spout 14 is otherwise not closed or sealed when the measuring chamber duct 30a is full of substance and operationally aligned with the spout inlet 14a, inverting the storage container 13 and device 1 will transfer the substance out of the measuring chamber duct 30a, through the spout 14 and into a receiving container (not shown) in the same step.

The dispenser and measuring cap device 1 of the present disclosure therefore prevents any substance from exiting the storage container 13 unless it is (1) poured from the storage container 13 into the interface funnel 12c, (2) transferred from the interface funnel 12c through the funnel stem 12e into the measuring chamber duct 30a, (3) rotated with the measuring chamber duct 30a into operational alignment with the spout inlet 14a, and (5) poured through the spout outlet 14b out of an open spout 14. Conversely, the only way for contaminants and foreign matter to reach the bulk substance in the storage container 13 is by passing through the same steps in reverse order. While a user may easily accomplish each of these steps by purposely inverting the presently disclosed device 1 and twisting the divider rim 30b, it is highly improbable that these steps could be accomplished inadvertently.

Figure 10:
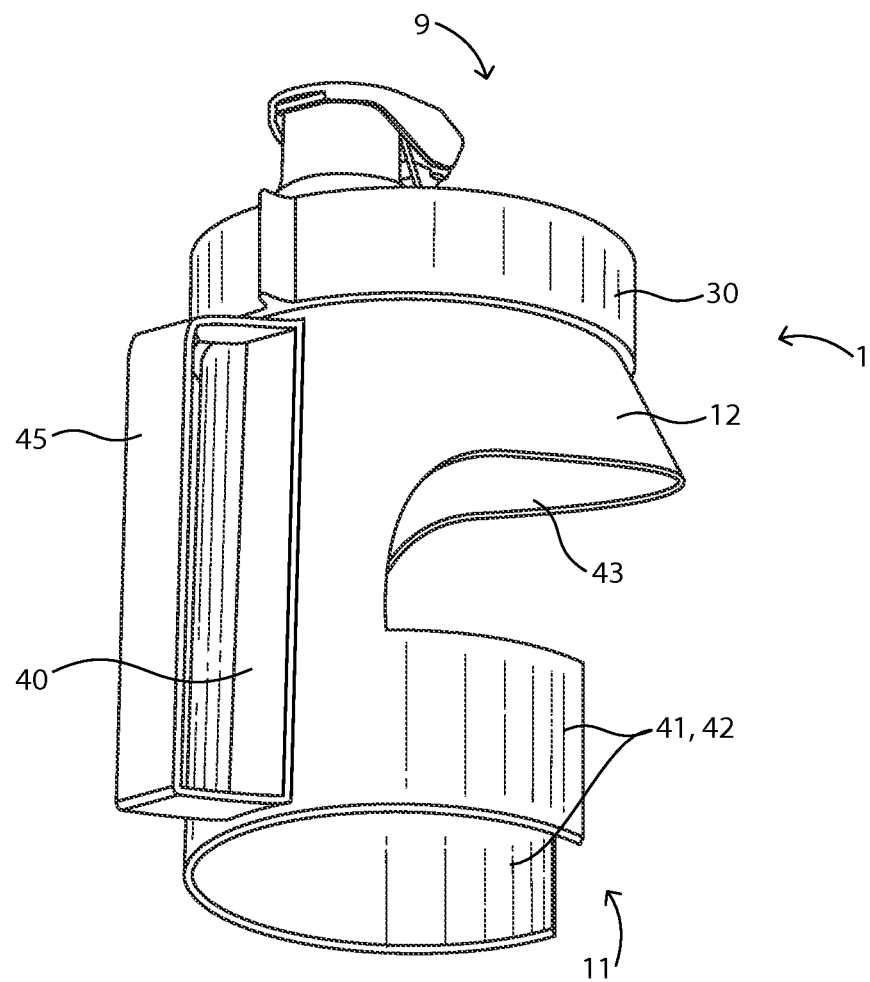
FIG. 10 shows a perspective view of an alternate embodiment of a dispenser and measuring cap constructed in accordance with the present disclosure.
Figure 11:
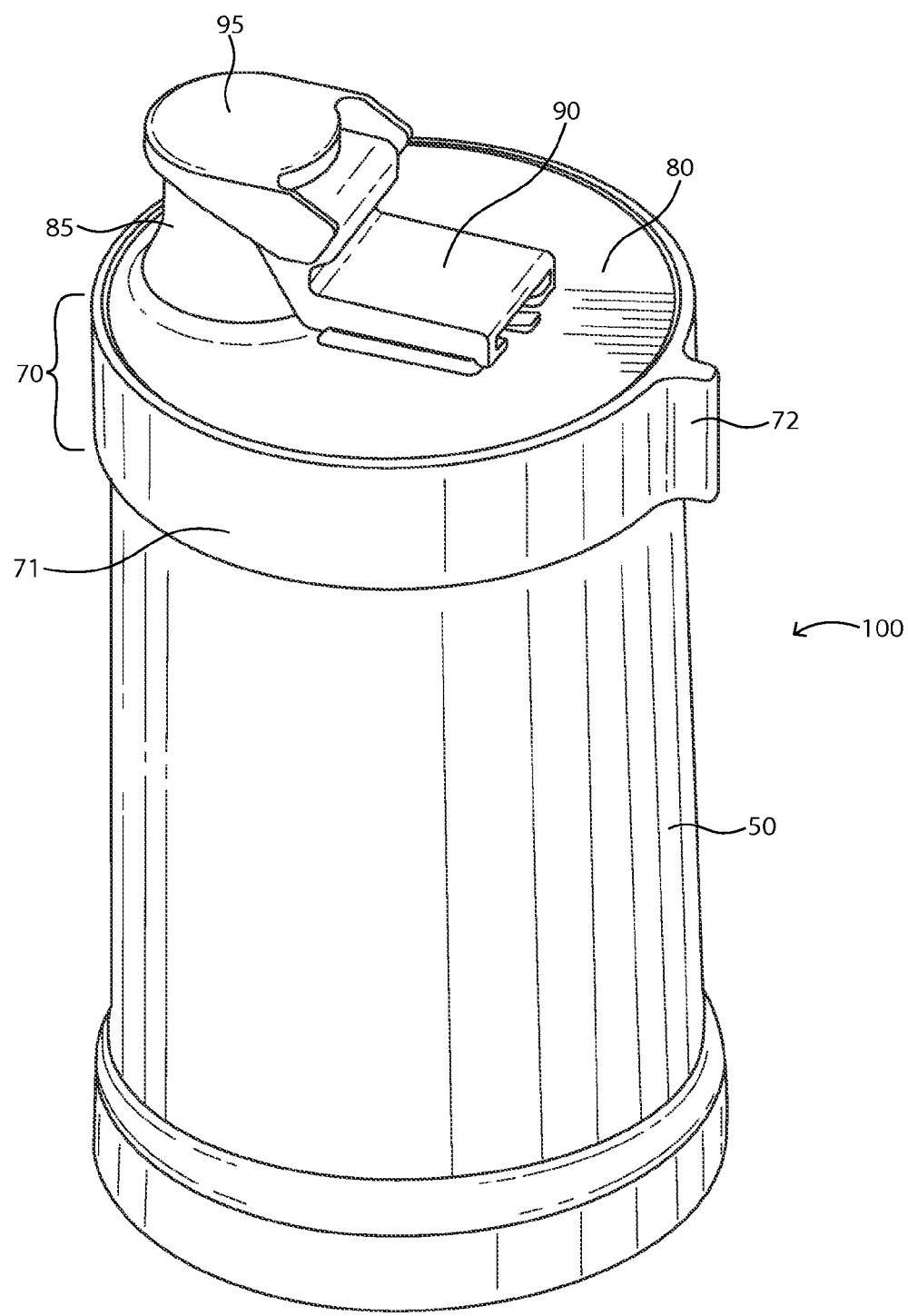
FIG. 11 shows a perspective view of another embodiment of a dispenser having an integral reusable storage container.
Figure 12:
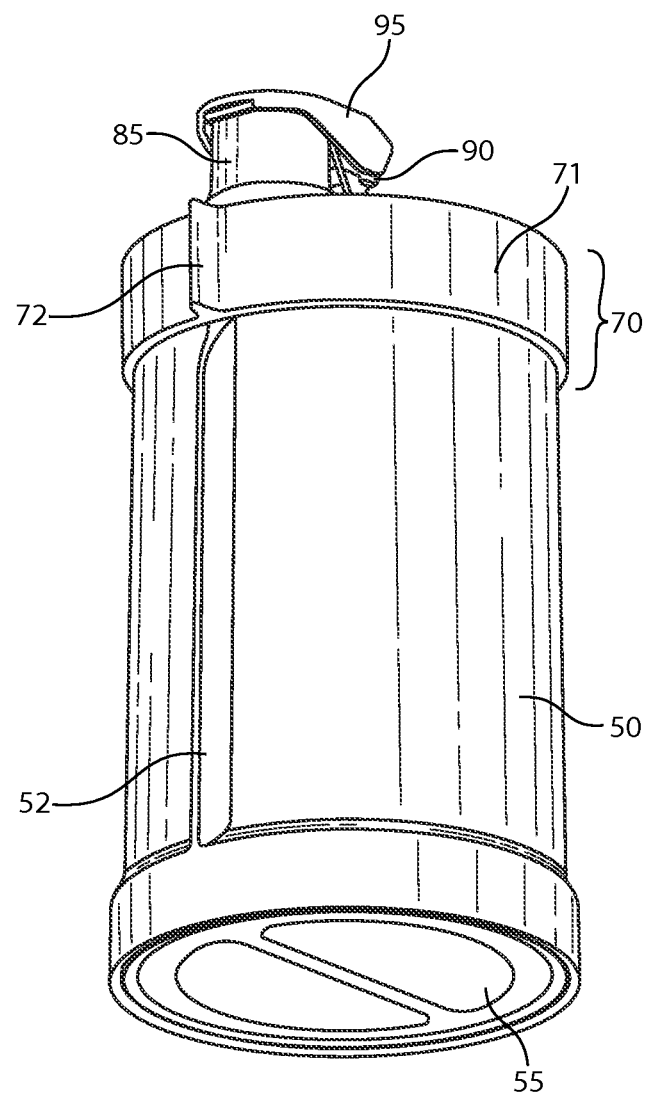
FIG. 12 is another perspective view of the dispenser of FIG. 11.
Figure 13:
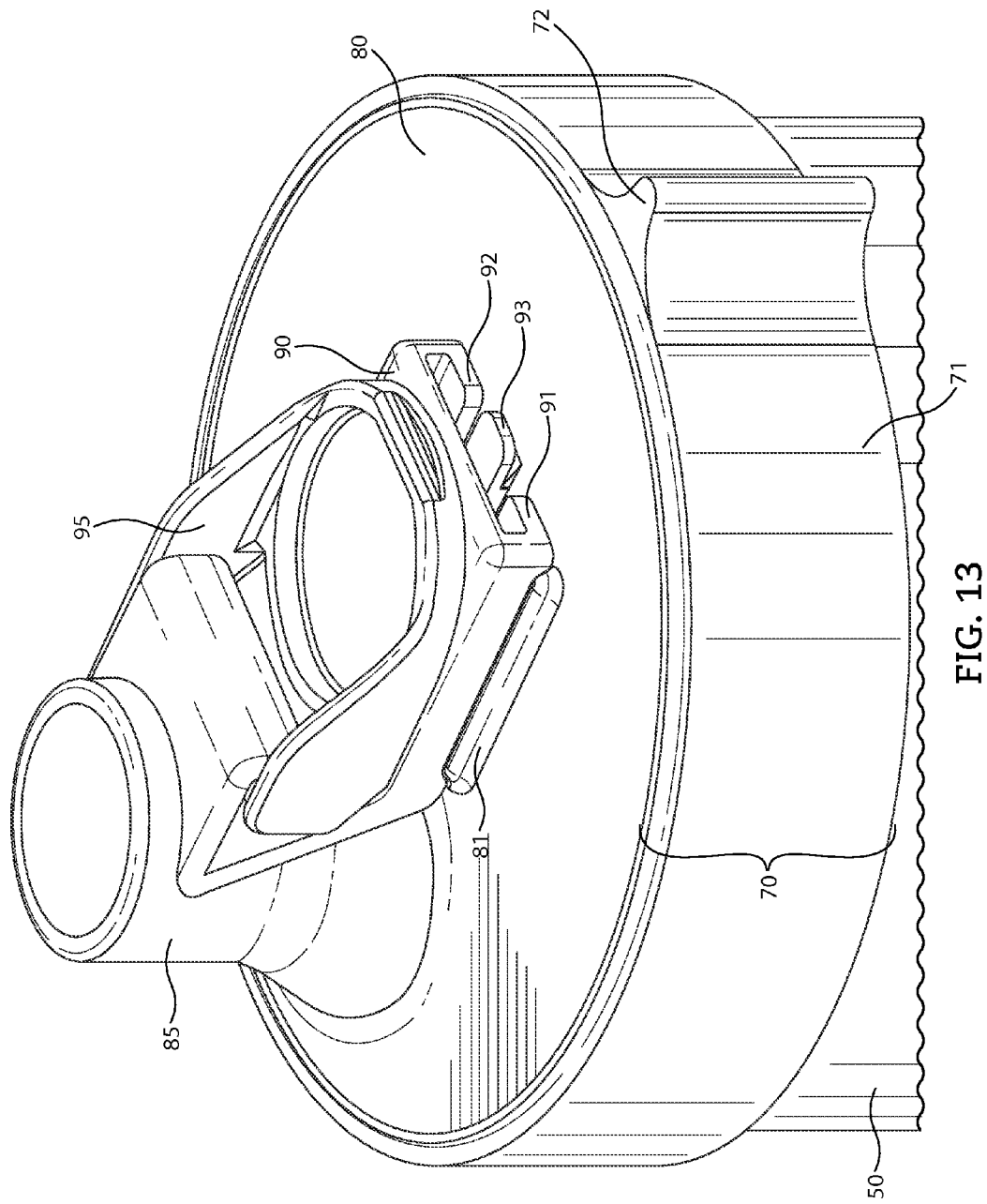
FIG. 13 is a detail view of the dispenser of FIG. 11 showing a retaining bracket and hingedly attached dispensing spout cap mounted on the proximal end piece.
Figure 14:
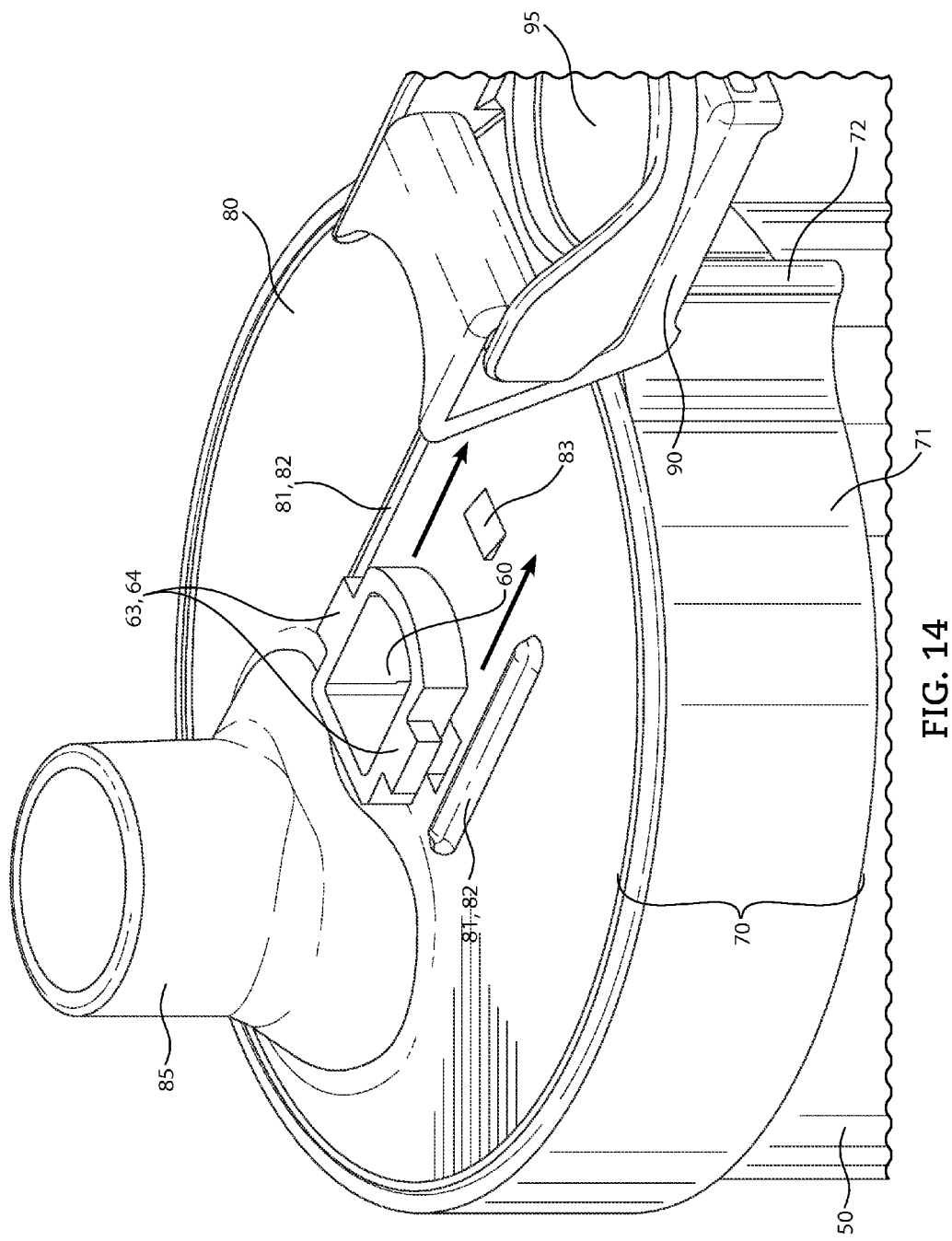
FIG. 14 is a second detail view of the dispenser of FIG. 11 showing how the retaining bracket and dispensing spout cap is slidably disengaged from the proximal end piece.

In an alternate embodiment shown in FIG. 10, the dispenser and measuring cap device 1 further comprises a handle 45 and a support frame 40 attached to the interface 12. The support frame 40 is configured with one or more braces or retaining arms 41, 42 for receiving and retaining a separate storage container. The upper portion of the frame 40 near the interface 12 is configured with a wide opening 43 so as to allow a user to easily insert and engage a storage container to the interface 12. The braces or retaining arms 41, 42 are formed of a resilient yet flexible material to allow a user to spread the braces to accept a storage container. Once a container is positioned between the braces 41, 42, the braces will return to their original position and retain the container stably in place against the frame 40 during use. In another embodiment (not shown), the braces can be a single deformable arm such as an elastic band or other similar member formed from a stretchy member that can retain a storage container in position against the frame 40 during use. An integral handle 45 is attached to the frame 40 and interface 12 to allow a user to comfortably, conveniently and accurately hold and operate the dispenser and measuring cap device 1 with only one hand. The dispenser and measuring cap device can also comprise a closeable dispensing spout. The spout can be positioned at any point on the uppermost surface of the proximal end piece relative to the handle. In some embodiments, the spout is positioned on the proximal end piece at a point near the handle. In other embodiments, the spout is positioned opposite the handle (not shown).

In another embodiment shown in FIGS. 11-17, the disclosure provides a handheld dispenser 100 comprising a reusable storage container 50, a removable container lid 55, a proximal end piece 80, a divider 70 disposed between and adjacent to the container 50 and the end piece 80, a central axle 60 protruding upward from an upper portion of the container 50 and extending through the divider 70 and end piece 80 along a central axis 65, and a removable retaining bracket 90 adapted to releasably yet retainingly engage the uppermost end of the central axle 60 to the proximal end piece 80. In some embodiments, the axle may be omitted.

Figure 15:
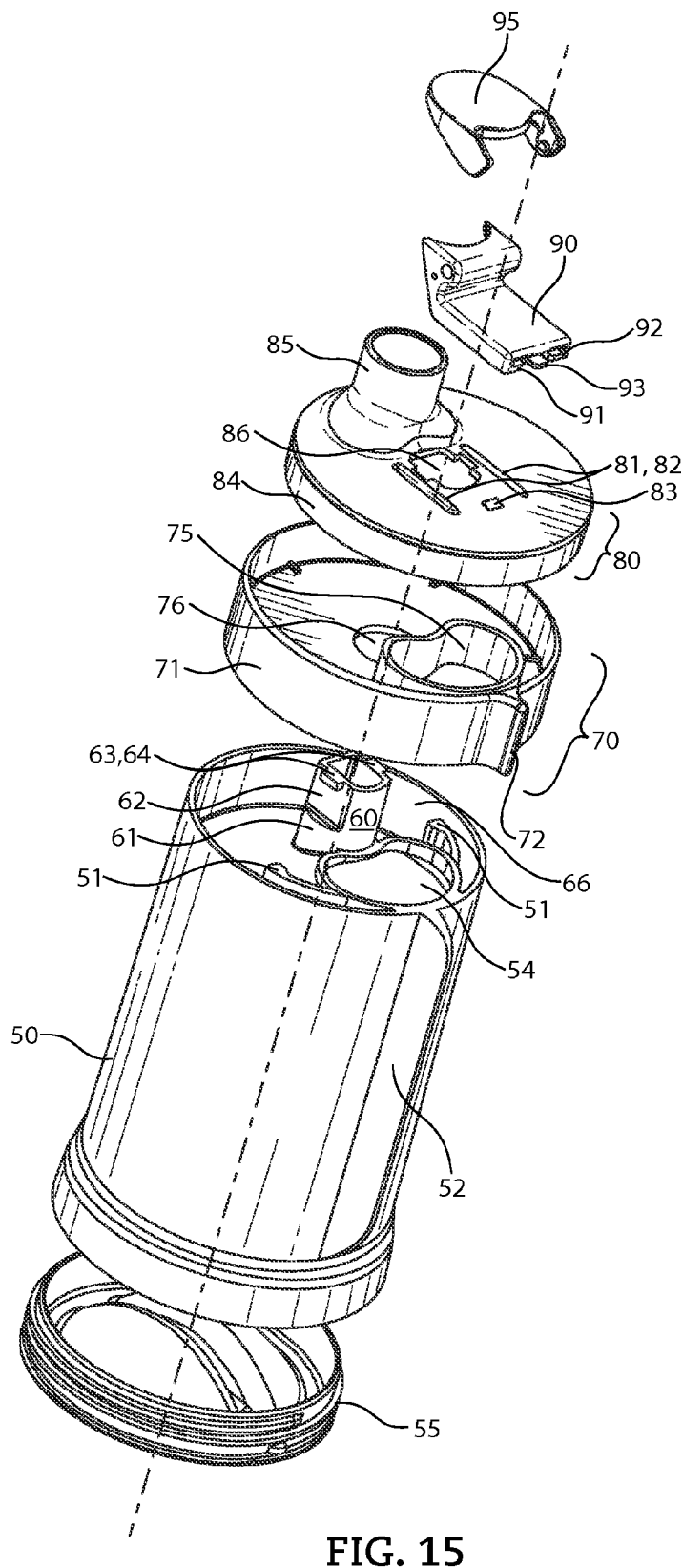
FIG. 15 shows an exploded top view of the dispenser of FIG. 11.
Figure 16:
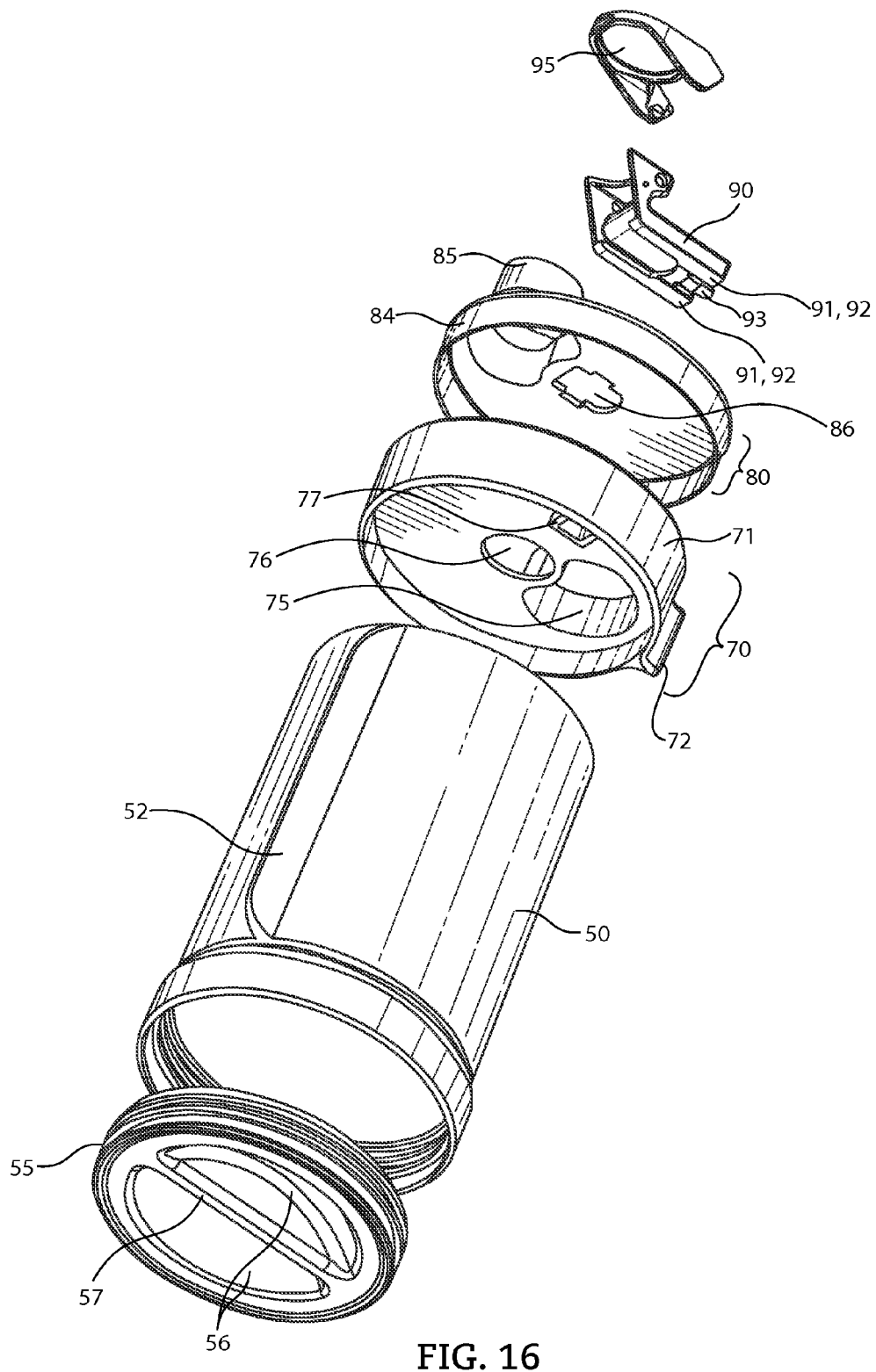
FIG. 16 shows an exploded bottom view of the dispenser of FIG. 11.
Figure 17:
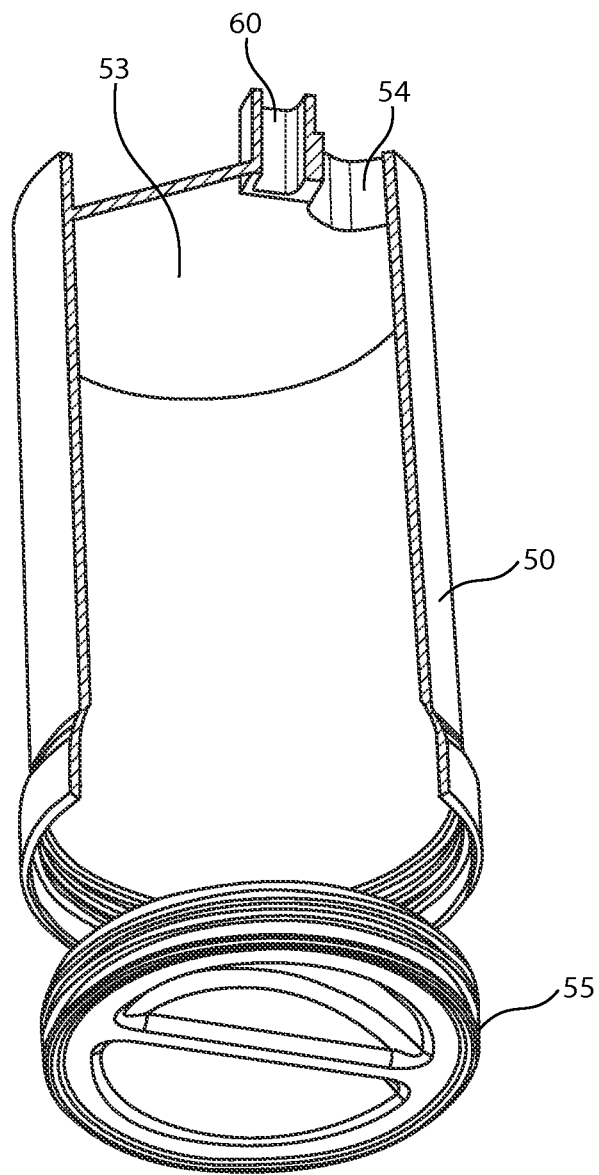
FIG. 17 shows a cutaway view of the upper portion of the integral storage container of the dispenser of FIG. 11.

In some embodiments, the reusable storage container 50 is molded together as one piece with an interface as described above. As shown in FIGS. 15-17, in other embodiments, the interior upper portion of the reusable storage container 50 comprises a wide-mouthed funnel 53 that slopes upward away from the inside of the container 50. The funnel 53 resolves into a funnel aperture 54 that is positioned off-center from the central axis 65 of the dispenser 100 and at the same height as the perimeter wall 66 of the container 50. In one embodiment, the funnel aperture 54 is defined by a short funnel stem. In another embodiment, the funnel aperture 54 is a simple hole with no substantial depth. As shown in FIG. 15, the exterior of the upper portion of the container 50 reflects the inverted slope of the funnel 53. The portion of the inverted funnel 53 that slopes away from the funnel aperture 54 is circumscribed by the upwardly extending perimeter wall 66 of the container 50. The container perimeter wall 66 extends upwardly to a uniform height above the inverted slope of the funnel 53 to define a trough or void adajacent the funnel aperture 54. Additionally, in some embodiments, the exterior circumference of the container 50 comprises indicia indicating the position of the funnel aperture 54, the dispensing spout 85, or both. The indicia can be numbers, letters, geometric symbols or the like. In one embodiment shown in FIG. 12, the indicia is a vertical ridge or raised line 72 disposed on the external surface of the container 50.

In some embodiments, the exterior of the upper portion of the container 50 further comprises one or more stop blocks 51. In one embodiment, the one or more stop blocks 51 are disposed on either or both sides of the funnel aperture 54. The stop blocks 51 are preferably arcuate in shape, but can be any shape sufficient to limit the rotation of a rotator stop 77 disposed on and extending downwardly from the underside of an attached divider 70. The stop blocks 51 interact with the rotator stop 77 to limit the rotation of the divider 70 around the central axis 65 and facilitate the respective operational alignment of a measuring chamber duct 75 in the divider 70 with the funnel aperture 74 and a dispensing spout 85.

The upper portion of the reusable storage container 50 further comprises a central axle 60 that protrudes upwardly from the inverted slope of the funnel 53 to a point above the height of the container perimeter wall 66. The central axle 60 is designed to extend axially upward from the upper portion of the storage container 50 through the divider 70 and the proximal end piece 80 of the dispenser 100. The axle 60 comprises a base portion 61 and an adjacent anchor portion 62 above the base portion. The base portion 61 extends from its base on the inverted slope of the funnel 53 to a point above the perimeter wall 66, and can be generally cylindrical in shape. In one embodiment, the cylindrical base portion 61 extends above the height of the perimeter wall 66 and through center portion of the divider 70. The anchor portion 62 of the central axle 60 extends from the base portion 61 through the proximal end piece 80. The anchor portion 62 can have flat sides or a non-cylindrical, asymmetric or irregular shape. In one embodiment, the anchor portion 62 has a generally rectangular shape, but is rounded on one end. The tip of the anchor portion 62 can be generally flat and can comprise one or more thin lock tabs 63, 64 that protrude radially outward from the flat sides of the anchor portion 62. In some implementations, the lock tabs 63, 64 protrude radially from the flat sides of the anchor portion 62 at an angle substantially perpendicular to the funnel aperture 54. In one embodiment, the portion of the central axle 60 comprising the lock tabs 63, 64 extends above the external surface of the proximal end piece 80 so that a small gap sufficient to receive and engage a retaining bracket 90 is created between the underside of the lock tabs 63, 64 and the surface of the proximal end piece 80. In another embodiment, the anchor portion of the axle comprises screw threads for receiving a retaining member to hold the components of the device together.

Turning to FIG. 16, the divider 70 is a generally circular member designed to be disposed on the upper portion of the reusable storage container 50 between the container and the proximal end piece 80. The divider 70 comprises a central axle port 76 adapted to receive the central axle 60. In some embodiments, the axle port 76 is the same shape as the base portion 61 of the central axle 60. In one embodiment, the axle port 76 is substantially circular. In certain embodiments, the divider 70 comprises a downwardly protruding rotator stop 77 adapted to interact with the stop blocks 51 disposed on either side of the funnel aperture 54 to limit rotation of the divider 70 around the central axle 60.

The divider 70 also comprises at least one measuring chamber duct 75 defining a predetermined volume. The divider 70 can alternatively comprise a plurality of measuring chamber ducts, each defining a different predetermined volume. In certain embodiments, a predetermined volume is equal to a single dose or single recommended serving for the substance to be measured and dispensed. For example, the internal volume defined by a measuring chamber duct can equal a single dose or single serving recommended for a particular brand of baby formula. The measuring chamber duct(s) can take any suitable shape, including that of a cylinder, ellipse, square, rectangle, triangle, ovoid etc. In some embodiments, a measuring chamber duct 75 has a cross section with the same shape as the funnel aperture 54.

The divider 70 is circumscribed by an external rim 71 that in some embodiments, protrudes beyond and overlaps the respective edges of the perimeter wall 66 of the container 50 and the proximal end piece 80. The external rim 71 can be adapted to be grasped by a user during use including. For example, in certain embodiments, the external rim 71 is configured with a radially extending handhold, tab, knob, grip or the like 72 adapted to facilitate one-handed rotation of the divider 70 around the central axle 60 and thus operational alignment of a measuring chamber duct 75 with the funnel aperture 54 and dispensing spout 85. In one embodiment, the tab 72 extends from the external rim 71 at a point radial from a measuring chamber duct 75 relative to the central axis 65.

The divider 70 can comprise indicia or labels indicating the location and/or volume of a given measuring chamber duct 75 in the divider. The indicia can be positioned on the exterior rim 71 of the divider 70 to compliment indicia present on the container 50 or the proximal end piece 80 to indicate when a given measuring chamber duct 75 is in operational alignment with the funnel aperture 54 and the dispensing spout 85. In one embodiment, the indicia is a handhold, tab, knob or grip 72. For example, a tab 72 can indicate when a measuring chamber duct 75 is rotated into vertical alignment with the dispensing spout 85 by aligning with indicia 52 on the side of the container 50 that corresponds to the location of the spout. The use of physical, tactile indicia allows a user to operate the dispenser 100 when the user is looking elsewhere. In some embodiments, a tab 72 or indicia on the external rim 71 facilitates selection and dispensation by a user of a desired amount of substance according to indicia or labels on the exterior of the container 50 or the surface of the proximal end piece 80. In some embodiments, the exterior rim 71 may be marked or labeled to indicate whether a measuring chamber duct 75 is in operational alignment with the funnel aperture 54 or spout 85. In one embodiment, the indicia are legible from either an inverted or upright position.

The proximal end piece 80 is a thin, generally flat disk that comprises a closeable dispensing spout 85 as described above. In some embodiments, the proximal end piece 80 further comprises a circular or non-circular axle hole 86 through which the central axle 60 protrudes, and at least one surface feature configured to interface with a retaining member disposed on its external surface. For example, retaining bracket guiderails 81, 82, can be disposed on each side of the axle hole 86. The retaining bracket guiderails 81, 82 are adapted to slidably engage a retaining bracket 90 as described below. In some embodiments, the axle hole 86 has a shape that generally corresponds to a shape defined by the silhouette of the anchor portion 62 and lock tabs 63, 64 of the central axle 60. In this way, the shape of the axle hole 86 prevents the proximal end piece 80 from rotating relative to the central axle 60 and the funnel aperture 54. In other embodiments, the axle hole 86 has a shape that generally corresponds to the portion of the central axle which extends through the end piece. In one embodiment, the proximal end piece 80 further comprises a downwardly extending stabilizing wall 84 configured to fit into and free rotate within the external rim 71 of the divider 70.

A retaining member is any device, such as a clip or screw, that can interface with the axle to hold the various components of the device together. In some embodiments, the retaining member can be a retaining bracket 90. The retaining bracket 90 is a generally thin, flat clip adapted to slide into a track defined by the retaining bracket guiderails 81, 82 and engage the locking tabs 63, 64 extending from the anchor portion 62 of the central axle 60 when the dispenser 100 is fully assembled. More specifically, the retaining bracket 90 comprises two downwardly extending generally L-shaped wings 91, 92 on its underside that are designed to wrap around the underside of the lock tabs 63, 64 extending radially from the anchor portion 62 of the central axle 60. Once engaged with the lock tabs 63, 64, the wings 91, 92 substantially contact the flat sides of the anchor portion 62 of the axle to prevent the axle and the lock tabs 63, 64 from turning and disengaging the bracket 90. The bracket 90 is also held in place on the proximal end piece 80 by the retaining bracket guiderails 81, 82. In this way, the retaining bracket 90 holds together the reusable storage container 50, divider 70 and proximal end piece 80. The rear portion of the retaining bracket 90 facing away from the dispensing spout 85 disposed on the proximal end piece 80 can comprise a releasable catch 93 adapted to engage a detent 83 or other suitable complimentary geometry on the surface of the proximal end piece 80 between the guiderails 81, 82 to releasably lock the bracket 90 in place and hold the assembled components of the dispenser 100 together. In some embodiments, the retaining bracket 90 itself is generally L-shaped.

In additional embodiments, the retaining member or bracket 90 comprises an integral dispensing spout cap 95 adapted to releasably close, cover and seal the dispensing spout 85. The cap 95 can be attached to the retaining bracket 90 by a hinge or any other suitable means. In one embodiment, the dispensing spout cap 95 is hingedly attached to the retaining bracket 90 and, when the retaining bracket 90 is fully engaged to the lock tabs 63, 64 of the central axle 60, helps to lock the bracket 90 in place on the central axle 60.

Figure 19:
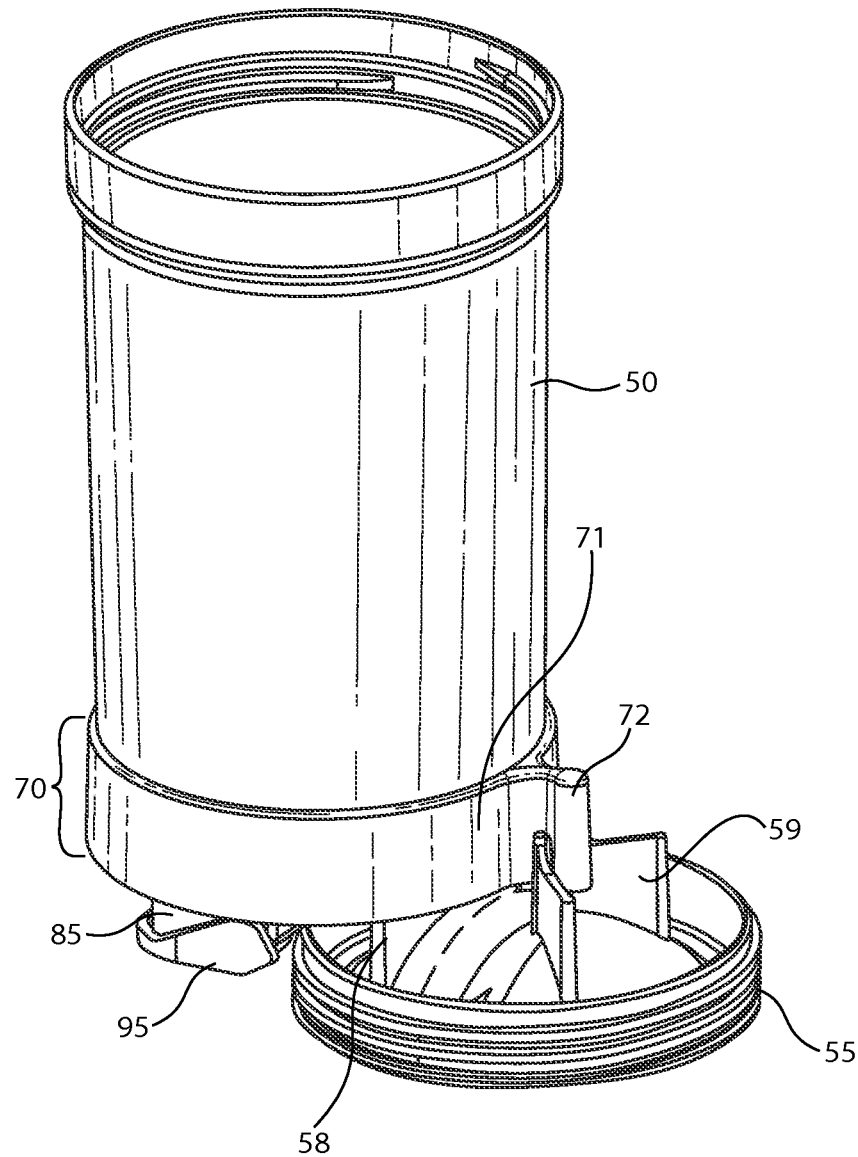
FIG. 19 shows a perspective view of the dispenser of FIG. 11 being held in an inverted position by a dispenser stand formed on the interior surface of a reusable storage container lid.

As shown in FIGS. 16, 17 and 19, the lower portion of the reusable storage container 50 comprises a closeable opening or mouth for filling the container with a substance to be portioned and dispensed. In some embodiments, the container 50 also comprises a removable lid 55 configured and adapted to releasably yet sealingly engage the opening or mouth in the bottom of the reusable storage container 50. Suitable means for sealably engaging (i.e., attaching) the lid 55 with the opening or mouth of the container 50 include, for example, screw threads, latches, insets, snaps, clips, tape, adhesive, nesting diameter, interlocking complementary geometry and the like.

Figure 18:
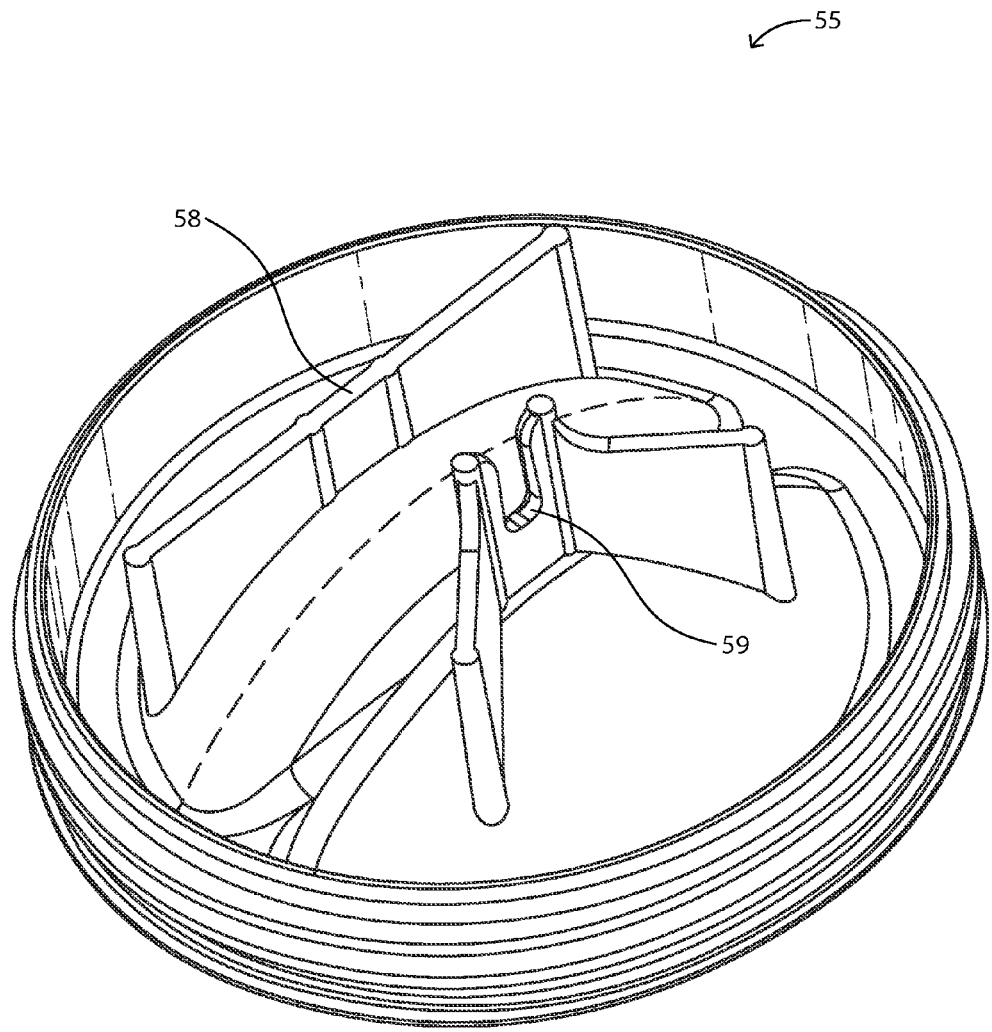
FIG. 18 shows a perspective view of the interior surface of a lid for a reusable storage container.
Figure 20:
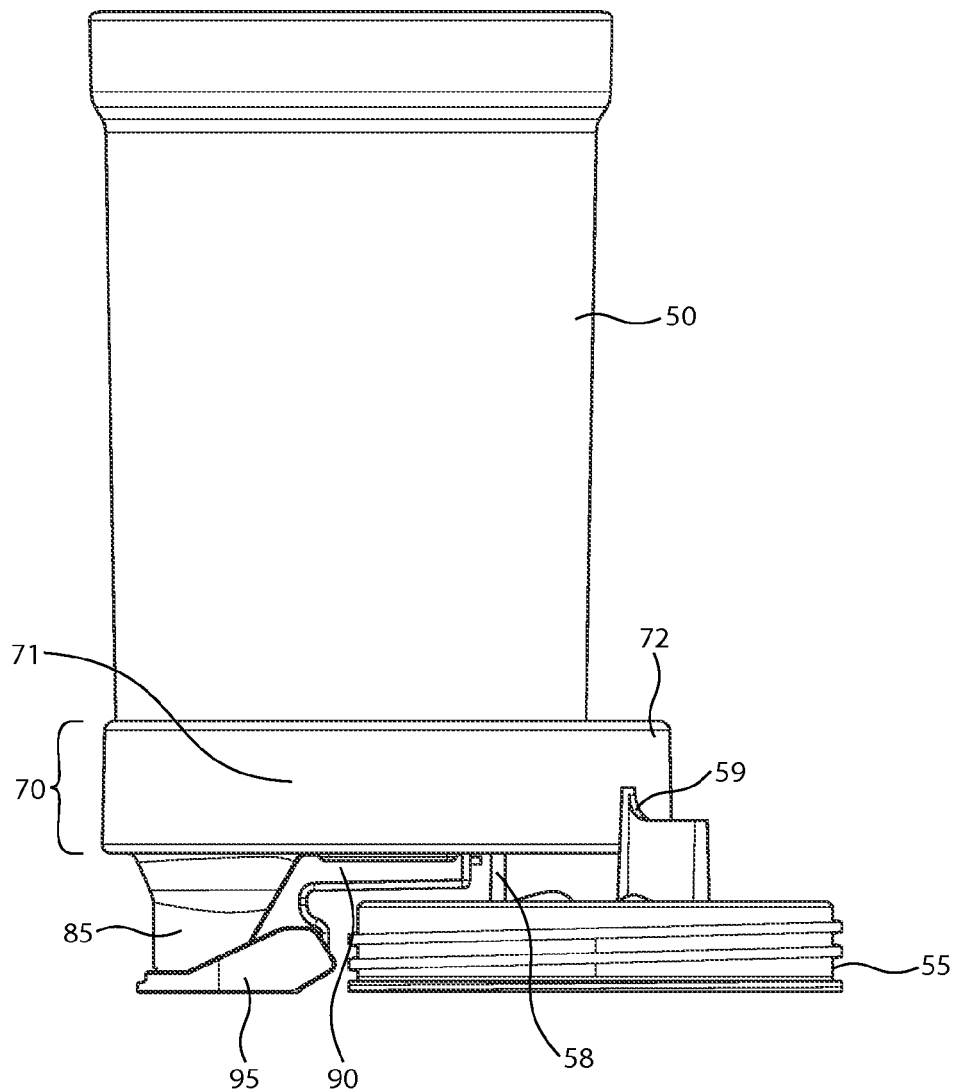
FIG. 20 shows a side view of the dispenser of FIG. 11 being held in an inverted position by a dispenser stand formed on the interior surface of a reusable storage container lid.

In some embodiments the bottom surface of the removable container lid 55 is configured with means to allow a user to easily and quickly grasp and operate the lid. In one embodiment, the lid 55 is configured with one or more shallow troughs 56 separated by an intervening wall 57. The troughs 56 are adapted to give purchase to a user's thumb and fingers while a user grasps the intervening wall 57 to engage or disengage the lid 55 from the container mouth. In additional embodiments, the interior surface of the lid 55 comprises means for holding an assembled dispenser 100 upside-down or in an inverted position while a user refills the container 50 with a substance to be portioned and dispensed. In some embodiments, the means comprises upwardly protruding geometry configured to receive and hold a dispenser 100 disclosed herein in an upside-down or inverted position. In one example illustrated by FIGS. 18-20, the interior surface of the container lid 55 comprises means to receive a divider tab 59 and means to stabilize a dispenser 58 while the dispenser 100 is inverted. In one embodiment, the interior surface of the lid 55 comprises a saddle 59 for receiving the a tab 72 extending radially from the exterior rim 71 of a divider 72 and a long flat brace 58 perpendicular thereto, the brace 58 having a uniform height for engaging the exterior surface of the proximal end piece 80 and stabilizing the dispenser 100 in an inverted position while a user refills the reusable storage container. In this way, the lid 55 serves as a dispenser stand for holding a dispenser upside down when a user needs to fill the reusable storage container 50.

All references, including publications, patent applications, and patents, cited herein are hereby incorporated by reference to the same extent as if each reference were individually and specifically indicated to be incorporated by reference and were set forth in its entirety herein.

Any capitalized and/or defined terms appearing in the specification include all variants, and singular and/or plural versions of the terms used herein and are not intended to be limiting or comprehensive, but merely to provide reference tools for understanding the invention. The use of the terms "a" and "an" and "the" and similar referents in the context of describing an invention (especially in the context of the following claims) are to be construed to cover both the singular and the plural, unless otherwise indicated herein or clearly contradicted by context. The terms "comprising," "having," "including," and "containing" are to be construed as open-ended terms (i.e., "including, but not limited to,") unless otherwise noted. Recitation of ranges as values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") herein, is intended merely to better illuminate the invention and does not pose a limitation on the scope of the invention (i.e., "such as, but not limited to,") unless otherwise claimed. No language in the specification should be construed as indicating that any non-claimed element is essential to the practice of the invention.

It is to be understood that the specific devices and/or processes illustrated in the attached drawings, and described in the foregoing specification are exemplary embodiments of the inventive concepts defined in the appended claims. Hence, specific dimensions and other physical characteristics relating to the embodiments disclosed herein are not to be considered as limiting, unless the claims expressly state otherwise.

Preferred embodiments of this invention are described herein. Variations of those preferred embodiments will be apparent to those having ordinary skill in the art upon reading the foregoing description and viewing the appended drawings. The inventors expect that skilled artisans will employ such variations as appropriate, and the inventors intend for the invention to be practiced other than as specifically described herein. Accordingly, the invention includes all modifications and equivalents of the subject matter recited in the claims appended hereto as permitted by applicable law. Moreover, any combination of the above-described elements in all possible variations hereof is encompassed by the invention unless otherwise indicated herein or otherwise clearly contradicted by context.

While the disclosure above sets forth the principles of the present invention, with the examples given for illustration only, one should realize that the use of the present invention includes all usual variations, adaptations and/or modifications within the scope of the claims attached as well as equivalents thereof. Those skilled in the art will appreciate from the foregoing that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A measuring and dispensing device, comprising:
   a) an end piece having a dispensing spout;
   b) a rotatable divider comprising:
      i) a duct defining a volume, and
      ii) an exterior rim configured to be manipulated by a user;
   c) a storage container comprising:
      i) a first end comprising a funnel that resolves into an aperture,
      ii) a second end comprising a container opening
      iii) an axle having an anchor portion extending through said divider and said end piece
      iv) a removable lid configured to close said container opening and hold said storage container in an inverted position; and
   d) a retaining member configured to releasably interface with said anchor portion and hold said divider and said end piece on said axle;
   wherein said duct is disposed between said end piece and said storage container, and is rotatable between a first position in operational alignment with said funnel aperture and a second position in operational alignment with said dispensing spout, and
   wherein said exterior rim extends radially beyond and overlaps at least a portion of a respective adjacent edge of each of said end piece and said container.

2. The device of claim 1, wherein said exterior rim comprises a handhold tab.

3. The device of claim 1, wherein said device further comprises a dispensing spout cap.

4. The device of claim 1, wherein said divider further comprises a rotator stop configured to facilitate operational alignment of said duct with said funnel aperture and said dispensing spout.

5. The device of claim 1, wherein said first end further comprises one or more stop blocks disposed on one or more sides of said funnel aperture.

6. The device of claim 1, wherein said divider further comprises indicia indicating the volume or location of said duct relative to said exterior rim.

7. The device of claim 1, wherein one or both of said divider and said storage container further comprises indicia indicating operational alignment of said duct with said funnel aperture.

8. The device of claim 1, wherein said divider comprises:
   a plurality of ducts, each defining a different volume, and
   indicia indicating the volume and location of each duct in said divider to enable a user to select a duct to measure and dispense a desired amount of a substance from said storage container.

9. The device of claim 1, wherein a cross section of each of said dispensing spout, said funnel aperture and said duct is approximately the same shape.

10. The device of claim 1, wherein said duct is closed on a proximal end when said duct is not in operational alignment with said dispensing spout.

11. The device of claim 1, wherein said duct is closed on a distal end when said duct is not in operational alignment with said funnel aperture.

12. The device of claim 1, wherein said funnel aperture is closed when said duct is not in operational alignment with said funnel aperture.

13. The device of claim 1, wherein said dispensing spout is closed when said duct is not in operational alignment with said dispensing spout.

14. A device for measuring and dispensing a substance, comprising:
   a) an end piece configured with a dispensing spout,
   b) an interface configured for releasable connection with a storage container, said interface comprising a funnel that resolves into an aperture;
   c) a divider disposed between said proximal end piece and said interface, said divider being rotatable relative to said end piece and said interface, said divider comprising:
      i) at least one duct defining a volume, and
      ii) an exterior rim adapted to be manipulated by a user that extends radially beyond and overlaps at least a portion of a respective adjacent edge of each of said end piece and said interface;
   d) an axle connecting said end piece, said divider and said interface;
   e) a support frame with one or more flexible arms connected to said interface; and
   f) a handle connected to said support frame;
   wherein said duct is rotatable between a first position in operational alignment with said funnel aperture and a second position in operational alignment with said dispensing spout, and
   wherein said dispensing spout and said funnel aperture are not rotatable relative to each other.

15. A measuring and dispensing device, comprising:
   a) an end piece comprising:
      i) a dispensing spout, and
      ii) at least one surface feature;
   b) a rotatable divider comprising:
      i) a duct defining a volume, and
      ii) an exterior rim configured to be manipulated by a user;
   c) a storage container comprising:
      i) a first end comprising a funnel that resolves into an aperture,
      ii) a second end comprising a container opening,
      iii) an axle having an anchor portion extending through said divider and said end piece; and
   d) a retaining bracket configured to releasably interface with said anchor portion and said at least one surface feature to hold said divider and said end piece on said axle;
   wherein said duct is disposed between said end piece and said storage container, and is rotatable between a first position in operational alignment with said funnel aperture and a second position in operational alignment with said dispensing spout, and
   wherein said exterior rim extends radially beyond and overlaps at least a portion of a respective adjacent edge of each of said end piece and said container.

16. The device of claim 15, wherein said exterior rim comprises a handhold tab.

17. The device of claim 15, wherein said device further comprises a dispensing spout cap.

18. The device of claim 15, wherein said divider further comprises a rotator stop configured to facilitate operational alignment of said duct with said funnel aperture and said dispensing spout.

19. The device of claim 15, wherein said first end further comprises one or more stop blocks disposed on one or more sides of said funnel aperture.

20. The device of claim 15, wherein one or both of said divider and said storage container further comprises indicia indicating operational alignment of said duct with said funnel aperture.

* * * * *